(12) United States Patent
Marple

(10) Patent No.: US 8,602,020 B2
(45) Date of Patent: Dec. 10, 2013

(54) FIRE GRATE FOR ENHANCED COMBUSTION WITH VERTICAL AND HORIZONTAL EXPANSION SLEEVES

(75) Inventor: Steve Marple, Bayfield, CO (US)

(73) Assignee: Earth's Flame, Inc., Corona, CA (US)

( * ) Notice: Subject to any disclaimer, the term of this patent is extended or adjusted under 35 U.S.C. 154(b) by 863 days.

(21) Appl. No.: 12/719,742

(22) Filed: Mar. 8, 2010

(65) Prior Publication Data

US 2011/0005511 A1   Jan. 13, 2011

Related U.S. Application Data

(63) Continuation-in-part of application No. 12/620,453, filed on Nov. 17, 2009, now abandoned, which is a continuation-in-part of application No. 12/501,869, filed on Jul. 13, 2009, now abandoned.

(51) Int. Cl.
*F23H 1/02* (2006.01)

(52) U.S. Cl.
USPC .......... 126/540; 126/503; 126/541; 126/521; 126/512; 110/298; 110/300

(58) Field of Classification Search
USPC ............. 126/503, 541, 521, 524, 522, 525, 126/163 R, 517; 110/298, 300, 311
See application file for complete search history.

(56) References Cited

U.S. PATENT DOCUMENTS

| | | |
|---|---|---|
| 92,526 A | 7/1869 | Hamilton |
| 114,280 A | 5/1871 | Farris |
| 1,191,848 A | 7/1916 | Stout |
| 2,360,611 A * | 10/1944 | Leonard ............ 126/512 |
| 3,380,472 A | 4/1968 | Leighton |
| 3,416,733 A | 12/1968 | Leighton |
| 3,905,351 A | 9/1975 | Hatfield et al. |
| 3,942,509 A | 3/1976 | Sasser |
| 4,078,542 A | 3/1978 | Young et al. |
| 4,122,825 A | 10/1978 | Slate |
| 4,149,517 A | 4/1979 | Horwinski |

(Continued)

FOREIGN PATENT DOCUMENTS

GB   873025 A   7/1961

OTHER PUBLICATIONS

Wikipedia, "Fireplace"; http://en.wikipedia.org/wiki/Fireplace (3 pages), Oct. 17, 2009.

(Continued)

*Primary Examiner* — Avinash Savani
(74) *Attorney, Agent, or Firm* — Stetina Brunda Garred & Brucker

(57) ABSTRACT

An improved fire grate may provide fresh oxygen rich air to a secondary combustion zone, created by the improved fire grate, of a combustion chamber where a combustion gas stream is typically oxygen starved assisting in the burning process of incompletely burned particulates and reducing other harmful emissions. A baffle plate may be introduced in the secondary combustion zone to increase a combustion chamber temperature, encourage mixing of oxygen starved air with oxygen rich air and increase a residence time of the combustion gas within the combustion chamber. These aspects of the baffle plate promote more efficient burning of the biomass/fuel. Additionally, log lighter(s) may be disposed in the secondary combustion zone to increase a temperature of the combustion chamber for the purposes of reducing harmful emissions. The improved fire grate may be horizontally and vertically adjusted to fit within different sized fireplace combustion chambers.

25 Claims, 17 Drawing Sheets

(56) References Cited

U.S. PATENT DOCUMENTS

| | | | |
|---|---|---|---|
| 4,203,417 A | 5/1980 | Boyd | |
| 4,206,875 A | 6/1980 | Grasso | |
| 4,310,303 A | 1/1982 | Collier | |
| 4,334,517 A | 6/1982 | Sweitzer | |
| 4,349,009 A | 9/1982 | Patterson et al. | |
| 4,404,954 A * | 9/1983 | Steel | 126/527 |
| 4,445,497 A | 5/1984 | Kilday, Sr. | |
| 4,515,147 A | 5/1985 | Van Grouw et al. | |
| 4,672,946 A | 6/1987 | Craver | |
| 5,113,843 A | 5/1992 | Henry et al. | |
| 5,179,933 A | 1/1993 | McCrillis et al. | |
| 5,263,471 A | 11/1993 | Shimek et al. | |
| 5,322,052 A | 6/1994 | McCrillis et al. | |
| 5,341,794 A | 8/1994 | Henry et al. | |
| 5,850,830 A | 12/1998 | Smith | |
| 5,934,270 A | 8/1999 | Kim | |
| 6,484,714 B1 | 11/2002 | Smith | |
| 6,688,302 B2 | 2/2004 | Henry et al. | |
| 7,047,962 B2 | 5/2006 | Henry et al. | |
| 7,216,645 B2 | 5/2007 | Henry et al. | |

OTHER PUBLICATIONS

Achoo! Allergy & Air Products, "Wood-Burning Fireplaces & Air Pollution"; http://www.achooallergy.com/fireplace-air-pollution.asp (2 pages).

Carter, Tim/Ask the Builder, "Fireplace Design & Dimensions"; http://www.askthebuilder.com/B110_Fireplace_Design_Dimensions.shtml (7 pages), 1993-2009.

The Brick Industry Association, "Technical Notes 19A—Residential Fireplaces, Details and Construction"; Rev [May 1980]; Reissued Aug. 2000; http://www.gobrick.com/BIA/technotes/t19a.htm (9 pages).

The Brick Industry Association, "Technical Notes 19—Residential Fireplace Design"; Jan. 1993; http://www.gobrick.com/BIA/technotes/t19.htm (14 pages).

National Risk Management Research Laboratory, "Wood Stove Emissions: Particle Size and Chemical Composition"; United States Environmental Protection Agency; EPA-600-R-00-050; Jun. 2000; 51 Pages.

\* cited by examiner

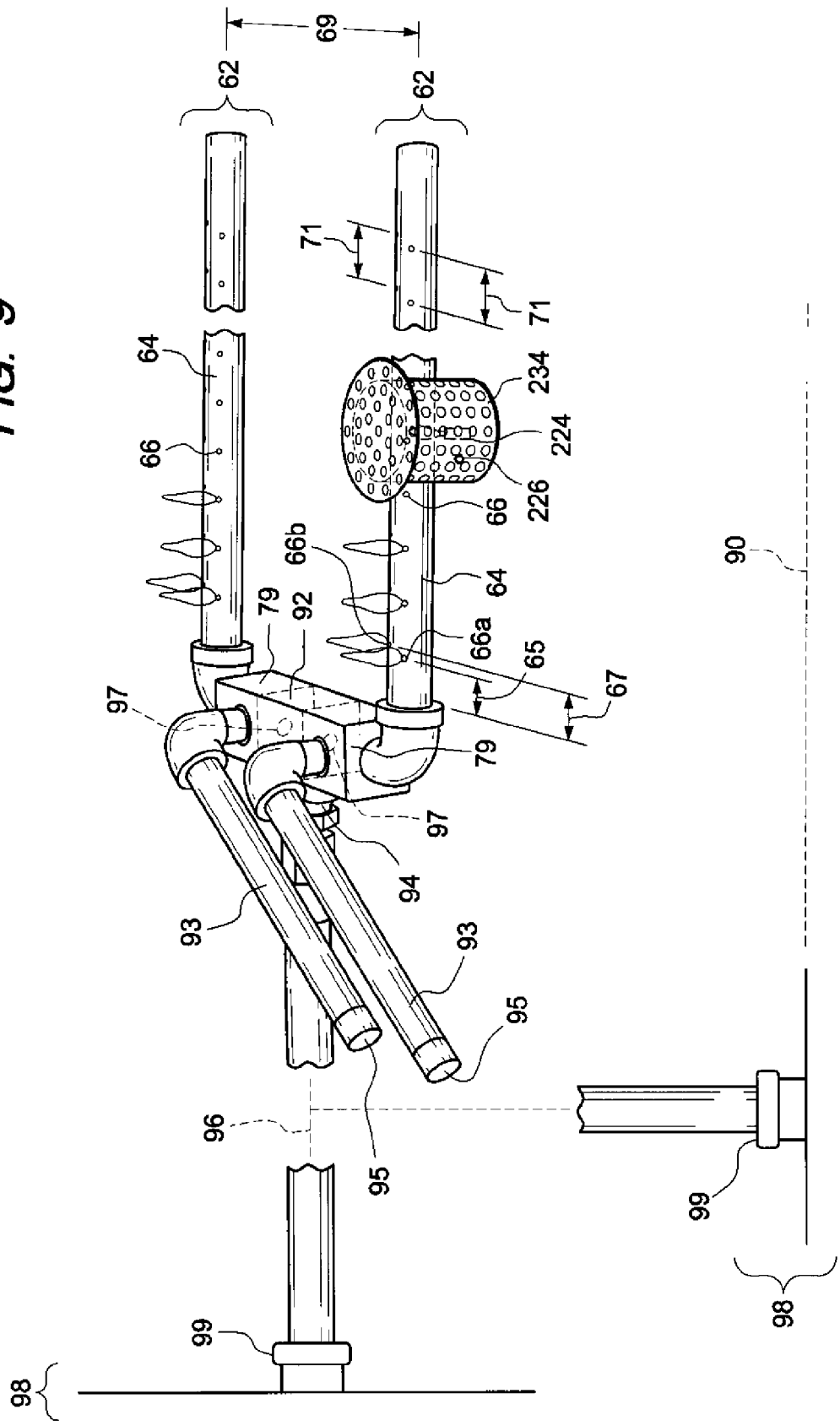

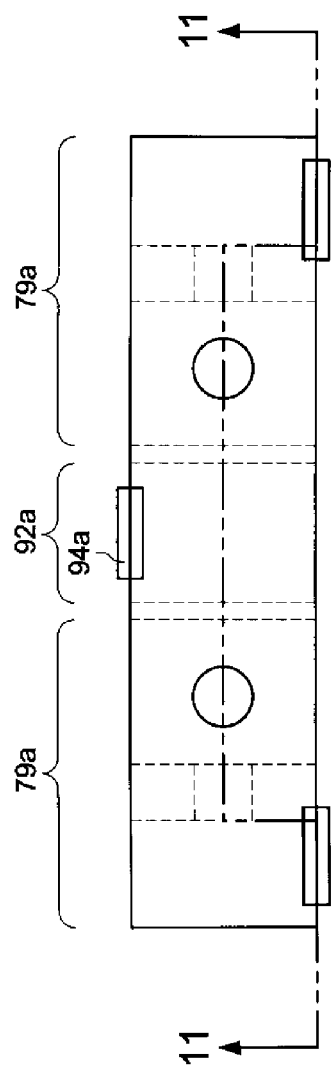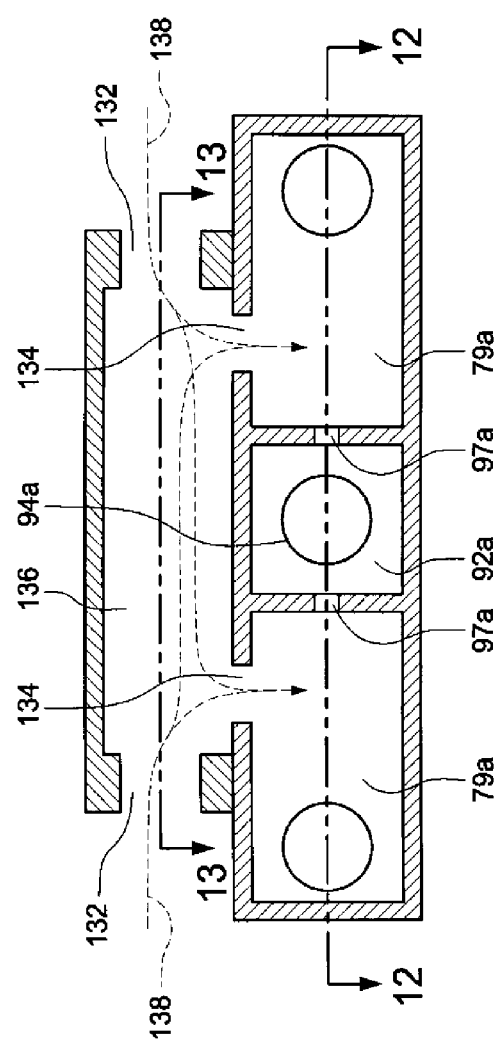

FIRE GRATE FOR ENHANCED COMBUSTION WITH VERTICAL AND HORIZONTAL EXPANSION SLEEVES

CROSS-REFERENCE TO RELATED APPLICATIONS

This application is a continuation-in-part application of U.S. patent application Ser. No. 12/620,453, filed on Nov. 17, 2009, now abandoned which is a continuation-in-part application of U.S. patent application Ser. No. 12/501,869, filed Jul. 13, 2009, now abandoned the entire contents of which are expressly incorporated herein by reference.

STATEMENT RE: FEDERALLY SPONSORED RESEARCH/DEVELOPMENT

Not Applicable

BACKGROUND

The improved fire grate for enhanced combustion relates to an apparatus for improving efficiency of a fireplace in relation to reduction in harmful emissions and/or heating a room.

A fireplace is a structure to contain a fire for heating. The fire is contained within a firebox which defines a combustion chamber. A chimney or other flue directs combustion gas to the environment. Studies have shown that fireplaces produce a significant amount of emissions (e.g., particulate, carbon monoxide, volatile organic compounds, etc.) that is harmful to humans and the environment. These harmful emissions rise up with the combustion gas and escape through the chimney to the environment.

There are three time honored principles to good combustion. They relate to time, temperature and turbulence. Time is residence time or the amount of time combustion gas remains within the combustion chamber. The longer the combustion gas stays within the combustion chamber, the more complete the combustion process and harmful emissions are reduced. Temperature relates to the temperature within the combustion chamber. The higher the temperature, the better and efficient the burn. As such, there are less harmful emissions. Turbulence relates to the amount of air mixing occurring within the combustion chamber. During operation of the fireplace, the biomass/fuel being burned consumes oxygen in the surrounding area. Fresh air is introduced into the combustion chamber through the fireplace opening. Stratified columns of fresh oxygen rich air rise up in the combustion chamber along side the starved combustion gases. The harmful emissions contained within the oxygen starved combustion gases do not come into contact with the oxygen rich air. Turbulence promotes mixing of the stratified layers or columns of fresh oxygen rich air with the oxygen starved air to encourage a cleaner burn and reduce harmful emissions.

The biomass/fuel being burned produces harmful emissions because the residence time of the combustion gas in the combustion chamber may be too short to allow the biomass/fuel to completely combust. Additionally, the biomass/fuel being burned may not completely combust because the temperature within the combustion chamber may be too low. Moreover, during the combustion process of the biomass/fuel, oxygen in the surrounding area of the biomass/fuel is consumed thereby producing oxygen starved combustion gases. These oxygen starved combustion gases rise, containing the harmful emissions, up through the combustion chamber into the chimney and out into the environment in a vertical column.

BRIEF SUMMARY

The improved fire grate addresses the needs of reducing harmful emissions discussed above, discussed below and those that are known in the art.

The improved fire grate may be disposed within a combustion chamber of a conventional fireplace. The conventional fireplace defines a single combustion zone. The improved fire grate creates two combustion zones, a primary and secondary combustion zone. This primary combustion zone is at the lower portion of the combustion chamber. The primary combustion zone is the part of the combustion chamber in which the biomass/fuel is being burned. During combustion or burning of biomass/fuel, combustion gases will rise up due to convection (i.e., rising hot air). Any harmful emissions (e.g., particulate matter, carbon monoxide, etc.) may float or be contained within that combustion gas stream.

The improved fire grate comprises a hollow tubular conduit that routes fresh oxygen rich air into the combustion chamber and releases the fresh oxygen rich air in a secondary combustion zone of the combustion process. The secondary combustion zone is above the primary combustion zone within the combustion chamber. The hollow tubular conduit may bring fresh oxygen rich air from the room through the fireplace opening or from any reliable oxygen rich air source. The hollow tubular conduit may be routed to the back of the fireplace up and over the biomass/fuel. The hollow tubular conduit may have a plurality of air apertures for releasing the fresh oxygen rich air into the secondary combustion zone where it generally has less oxygen compared to the primary combustion zone.

The hollow tubular conduit may define an upper frame comprised of a plurality of hollow tubes. These tubes may be configured to cover a substantial area of the combustion chamber over the biomass/fuel. By way of example and not limitation, first and second tubes may be generally parallel and be placed at the front and rear of the combustion chamber. Side tubes may be in fluid communication with the front and rear tubes. One or more of the first tube, second tube and side tubes may have air apertures which permit the air brought in from the fresh oxygen rich air source to be introduced into the secondary combustion zone of the combustion chamber. The fresh oxygen rich air is introduced into the secondary combustion zone since the secondary combustion zone will typically have less air or oxygen. The air or oxygen resident within the fireplace was partially consumed during the burning process in the primary combustion zone. The combustion gas that rises above the fuel source into the secondary combustion zone is oxygen starved. The fresh oxygen rich air introduced into the secondary combustion zone via the hollow tubular conduit provides an additional source of fresh oxygen rich air to assist in the completion of the burning process for the incompletely combusted harmful emissions. As the fresh oxygen rich air is routed from the fresh oxygen rich air source to the upper frame, the fresh oxygen rich air may be preheated prior to introduction in the secondary combustion zone to maintain the temperature at the secondary combustion zone. This is accomplished by routing the hollow tubular conduit from the fireplace opening, back to the rear of the combustion chamber, and up to the secondary combustion zone. The hollow tubular conduit is exposed to the heat in the combustion chamber.

In addition to supplying fresh oxygen to the secondary combustion zone of the combustion chamber, a baffle plate may be disposed over the biomass/fuel to be burned. The baffle plate interrupts the flame path rising up from the biomass/fuel being burnt in the sense of velocity, direction and turbulence. The interruption of the flame path encourages larger incompletely burned harmful particulate to fall out of the combustion gas stream and may be reentrained in the combustion gas stream at an earlier point and rise back up toward the baffle plate. This allows the harmful particulate to stay within the flame path for a longer period of time (i.e., longer residence time) and promotes more complete combustion thereby reducing harmful emissions. There are generally less harmful particulate, the more time the particulate stays within the combustion chamber. Also, a more complete combustion is promoted thereby reducing harmful emissions. The baffle plate may be fabricated from a refractory material or another material having good insulation characteristics. As such, the baffle plate increases the temperature at the secondary combustion zone as well as the primary combustion zone to promote complete burning of the harmful particulate matter. It is also contemplated that the baffle plate may have a lower surface formed with a plurality of channels or other groove shapes to interrupt the flow of gas flowing up from the fuel source to the chimney. The channels or grooves formed in the lower surface of the baffle plate may be configured to route the combustion gas stream toward the sides of the baffle plate. When the gas stream from the sides of the baffle plate and the gas stream from the front of the baffle plate recombines above the baffle plate, turbulence may occur which promotes mixing of oxygen rich air with the oxygen starved air.

The baffle plate may also be tilted in the forward direction. Provided that the baffle plate also has good emissivity characteristics, the forward tilt may redirect heat from the burning biomass/fuel into the room to be heated. This may also allow the improved fire grate with enhanced combustion to be utilized in a zero clearance fireplace as well as a masonry fireplace. The baffle plate may optionally be disposed slightly forward of the fuel source to allow flames from the fuel source to rise up behind the baffle plate. This further splits up the gas stream such that the recombined gas streams above the baffle plate may be more turbulent and promote mixing of oxygen starved and oxygen rich air.

Optionally, a log lighter may be disposed in the primary combustion zone and below the biomass/fuel to be burned. This log lighter aids in rapid ignition of the biomass/fuel. The log lighter may be turned off after the biomass/fuel starts its burning process. However, it is also contemplated that the log lighter may be left on to promote efficient burning of the fuel source. Other log lighters may be disposed at other areas within the combustion chamber. By way of example and not limitation, one or more log lighters may be disposed in the secondary combustion zone of the combustion chamber. As discussed above, the baffle plate redirects the combusted gas stream having harmful emissions therein. The log lighter disposed in the secondary combustion zone may increase temperature in the secondary combustion zone. The increased temperature aids in completing the burning process of the biomass/fuel and reducing harmful emissions.

The improved fire grate provides for a unique and efficient supplement to any existing fireplace.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 9 is a perspective view of two fire sources connected to a first embodiment of a mixing chamber;
FIG. 10 is a top view of a second embodiment of a mixing chamber;
FIG. 11 is a cross sectional view of the second embodiment of the mixing chamber shown in FIG. 10.

DETAILED DESCRIPTION

Figure 1:
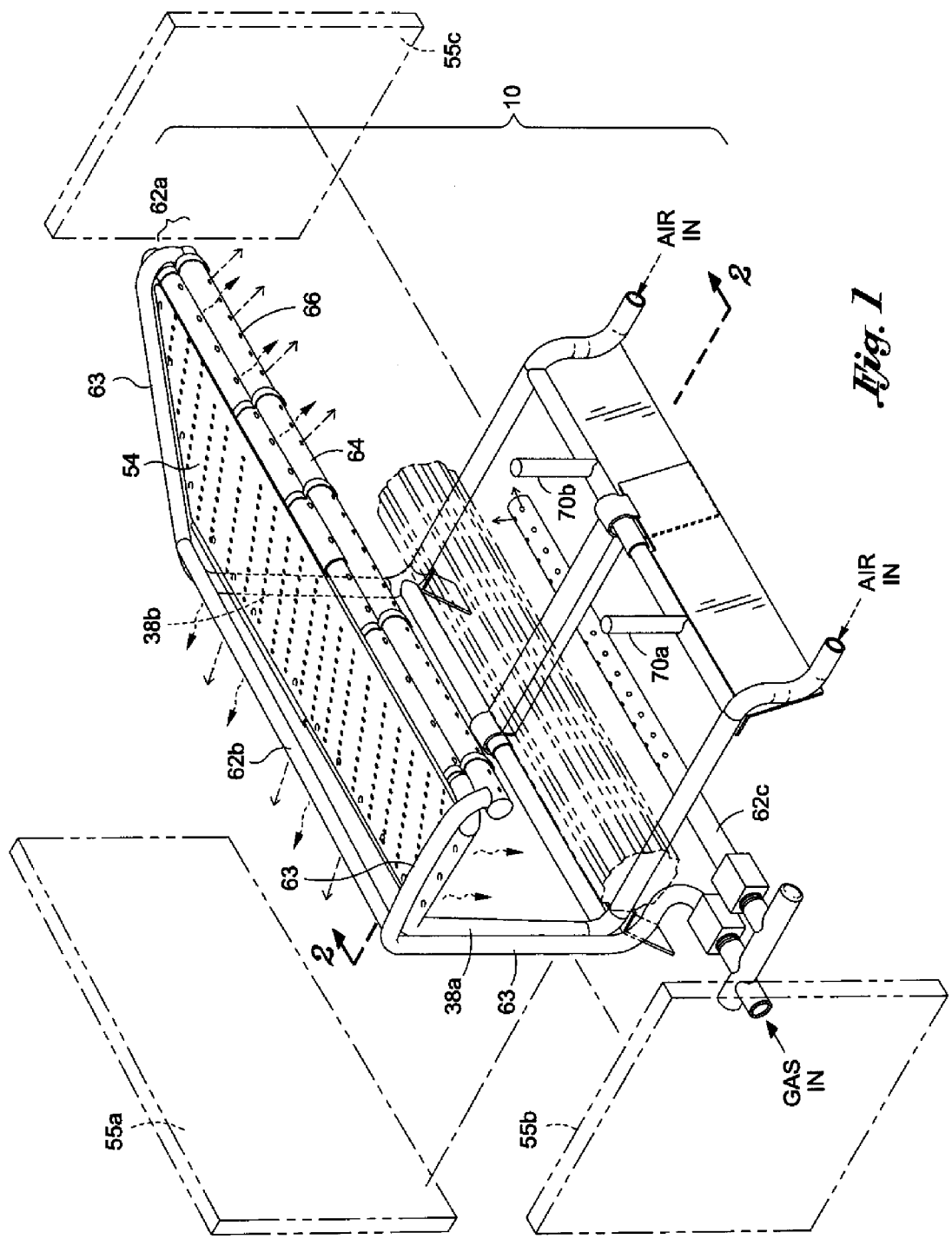
FIG. 1 is a perspective view of an improved fire grate.

Referring now to the drawings, an improved fire grate 10 for enhanced combustion is shown. The improved fire grate 10 may be disposed within a combustion chamber 12 (see FIG. 2) of a fireplace 14. The improved fire grate 10 introduces oxygen rich air to a secondary combustion zone 50 of the combustion chamber 12, retains heat within the combustion chamber 12 to increase a temperature of the combustion chamber 12, encourages mixing of oxygen rich air with oxygen starved combustion gas stream, and increases residence time of the combustion gas stream for the purpose of reducing harmful emissions during fireplace use. Also, another benefit may be reduction in chimney creosote buildup and reduction in chimney fires.

Figure 3:
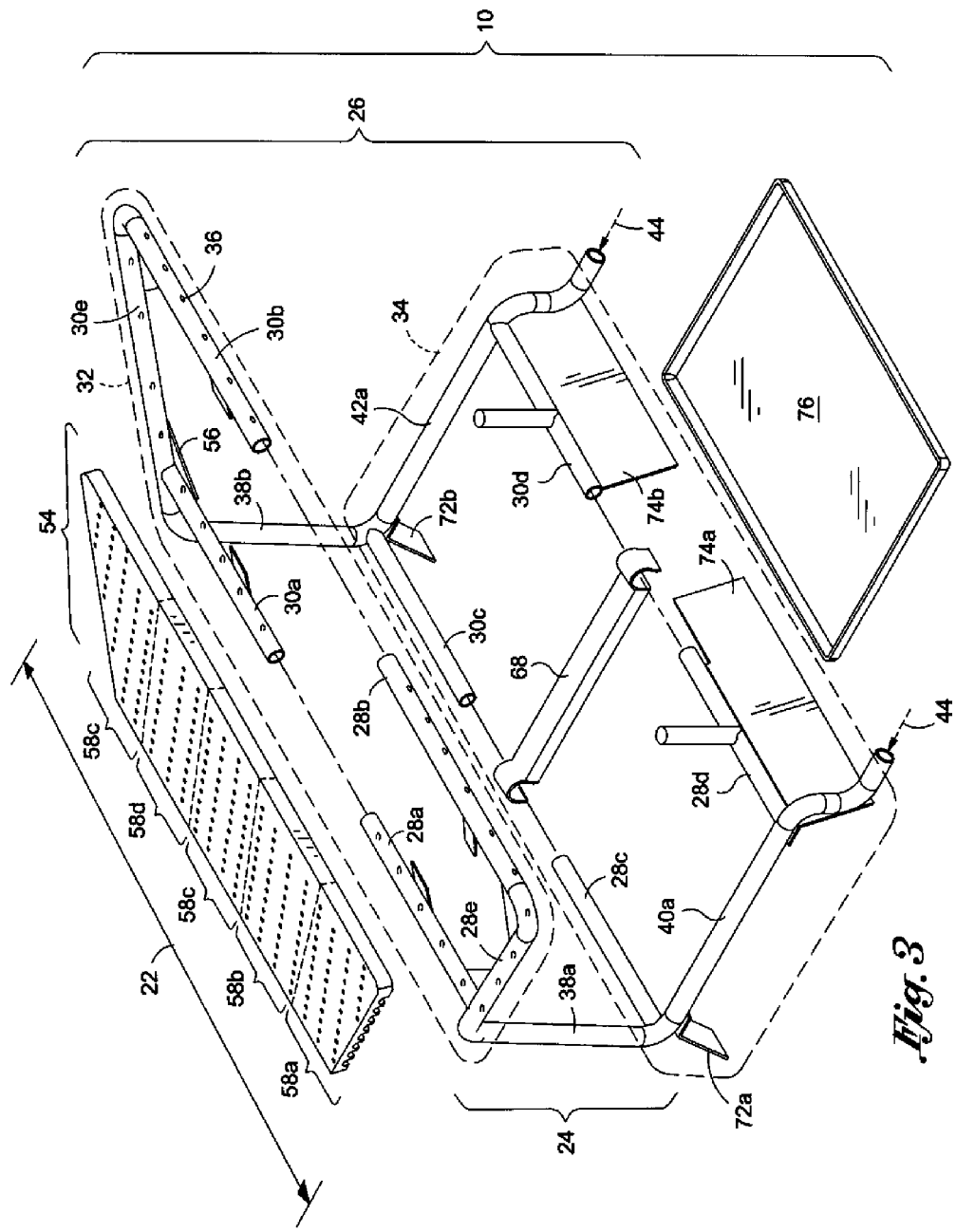
FIG. 3 is an exploded perspective view of the improved fire grate shown in FIG. 1.

Referring now to FIG. 3, an exploded view of the improved fire grate 10 is shown. The improved fire grate 10 may be fabricated from a tubular design made from a cost effective material (e.g., steel, 304 stainless steel, aluminum ceramics, etc.) of appropriate temperature and chemical resistance characteristic. The fire grate 10 may have an adjustable width 22. To this end, the improved fire grate 10 may have a first side 24 and a second side 26. The first side 24 may have a plurality of tubes 28a-d which are slidably insertable into tubes 30a-d of the second side 26 of the improved fire grate 10. The tubes 28a-d telescope into and out of the tubes 30a-d. More particularly, the tubes 28a, b, c, d may be insertable into tubes 30a, b, c, d, respectively. The tubes 28a-d may have a frictional fit with tubes 30a-d such that once the tubes 28a-d are inserted into tubes 30a-d, they 28a-d and 30a-d are set and do not need further adjustment to fit the combustion chamber 12. The installer adjusts the width 22 such that the first and second sides 24, 26 fill a substantial area of the combustion chamber 12. Alternatively, the first and second sets of tubes 28a-d and 30a-d may be fixed in relation to each other through a pin, setscrew or other means known in the art.

Additionally, the improved fire grate 10 may have an adjustable height. To this end, vertical tubes 38a, b may be telescoping and set to a height to fit within the combustion chamber 12. The telescoping length of the tubes 38a, b may be set by friction fit, pin, set screw or other means known in the art.

Figure 2:
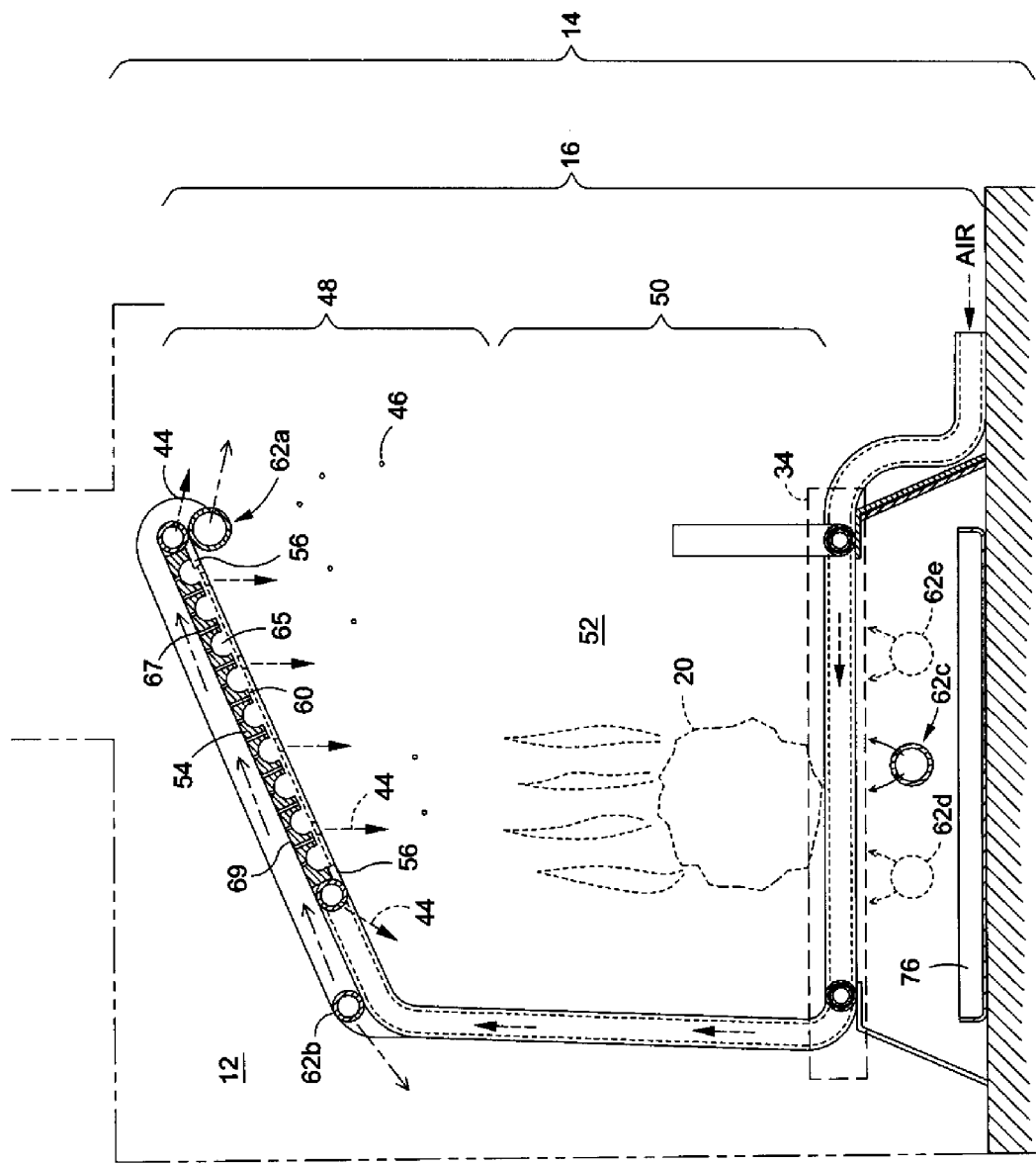
FIG. 2 is a cross sectional view of the improved fire grate shown in FIG. 1.

The improved fire grate 10 may have an upper frame 32 and a lower frame 34. The upper frame 32 may comprise the tubes 28a, b and 30a, b but also hollow tubes 28e and 30e which may be splayed to fit the general configuration of combustion chambers 12 of modern fireplaces 14 and/or to provide better cover of the burning biomass/fuel 20. One or more of the tubes 28a, b, e and 30a, b, e may have a plurality of air outlet holes 36 which introduces fresh oxygen rich air above the biomass/fuel 20, as shown in FIG. 2. The air outlet holes 36 may be formed to direct air down toward the biomass/fuel 20, and/or out toward the outer periphery of the upper frame 32 and/or inward toward the inner periphery of the upper frame 32. Fresh oxygen rich air 44 may be supplied to the upper frame 32 and out of the air outlet holes 36 via tubular supports 38a, b (see FIG. 3) and an airflow path through the tubes 40a and 42a (see FIG. 3) of the lower frame 34.

During operation, fresh air or oxygen 44 may enter through the tubes 40a, 42a of the lower frame 34 through induction (convection), forced airflow (e.g., blower), or other means known in the art. If via induction, the fire in the combustion chamber 12 heats up the tubes 38a, 38b, 40a, 42a, and the upper frame 32. Since hot air rises, the heat air rises through the tubes 38a, 38b, 40a, 42a, and the upper frame 32 and out of the air outlet holes 36. The fresh oxygen rich air 44 may be taken from the bottom front of the fireplace 14 or another fresh air source. The fresh oxygen rich air 44 flows through the tubes 40a, 42a and up through the tubular supports 38a, b. The fresh oxygen rich air 44 may be distributed throughout the tubular structure of the upper frame 32 and exit out of the air outlet holes 36 formed in one or more of the tubes 28a, b, e and 30a, b, e. As the fresh oxygen rich air 44 flows through the tubular structure 38, 40a, 42a, the fresh oxygen rich air 44 is preheated prior to being introduced into a secondary combustion zone 48 of the combustion chamber 12 (see FIG. 2) to maintain the higher temperature within the combustion chamber.

Initially, the biomass/fuel 20 is burned in a primary combustion zone 50 (see FIG. 2), namely, at the biomass/fuel 20. As the biomass/fuel 20 burns, the combustion process consumes both the biomass/fuel 20 as well as the surrounding oxygen 52. As the biomass/fuel 20 burns, some of the biomass/fuel 20 does not completely burn and rises as a of the combustion gas stream which includes harmful emissions such as particulate matter 46. Since hot air rises, the particulate matter 46 rises along with the rising combustion gas stream into the secondary combustion zone 48 where the particulate 46 comes into contact with fresh oxygen rich air 44 introduced into the secondary combustion zone 48 of the burning process via the upper frame 32. The introduction of fresh oxygen rich air 44 at the secondary combustion zone 48 assists to further the burning process to mitigate release of harmful emissions into the environment. Beneficially, oxygen rich air exits out of the holes 36 (see FIG. 3) in a location (i.e., secondary combustion zone of the combustion chamber) which is oxygen starved to complete the combustion and reduce harmful emissions. As discussed herein, the combustion gas stream may contain columns or stratified columns of oxygen starved air as well as oxygen rich air. The location of the holes 36 may be placed at a location where oxygen starved air is expected.

Referring back to FIG. 1, a baffle plate 54 having good insulating characteristics may be disposed about the inner periphery of the upper frame 32. By way of example and not limitation, the baffle plate 54 may be fabricated from a refractory material. As shown in FIG. 3, the inner periphery of the upper frame 32 may have a plurality of tabs 56 to hold up the baffle plate 54 within the inner periphery of the upper frame 32. In the event that the improved fire grate 10 has an adjustable width 22, the improved fire grate 10 may be provided with a plurality of baffle plate slabs 58a-e such that the appropriate slabs 58a-e may be fitted to the width 22 of the improved fire grate 10. The slabs 58a-e are shown in FIG. 3. The baffle plate 54 may be tilted in the forward direction, as shown in FIG. 2. This is to aid in reflecting heat out through the fireplace opening 16. More particularly, the lower surface 60 of the baffle plate 54 may face the fireplace opening 16 to accomplish the reflection of heat through the fireplace opening 16. The baffle plate 54, as discussed above, may have good insulating characteristics. As such, the baffle plate 54 may also increase the temperature in the secondary combustion zone 48 of the combustion chamber 12 to further encourage the combustion process and reduce harmful emissions. The increased heat in the secondary combustion zone 48 caused by the baffle plate 54 aids in the burning process of the harmful emissions in the secondary combustion zone 48 as well as in the primary combustion zone 50 to reduce harmful emissions into the atmosphere.

It is also contemplated that additional optional baffle plates 55a, b, c may be disposed at other areas of the improved fire grate 10, as shown in FIG. 1. By way of example and not limitation, a baffle plate 55a may be attached to the rear side of the improved fire grate 10 at tubes 38a, b. The baffle plate 54 attached to these tubes 38a, b may extend from the lower frame 34 to the upper frame 32 to increase a temperature within the primary combustion zone 50 and the secondary combustion zone 48. Additional baffle plates 55b, c may be lined on the sides of the improved fire grate 10 that extends from tubes 40a, 28e and 42a, 30e. These additional baffle plates 55a, b, c as well as baffle plate 54 also aid in maintaining or increasing the temperature at the primary combustion zone 50 and the secondary combustion zone 48 and promote more efficient combustion of the biomass/fuel 20. The baffle plates 55a, b, c may be attached to the fire grate 10 via adhesives, nut and bolts and/or other attachment methods known in the art.

The baffle plate 54 increases gas residence time of the combustion gas in the primary and secondary combustion zones 50, 48 thereby encouraging or promoting more complete combustion of the biomass/fuel 20 and reduction of harmful particulate. Additionally, the flame produced by the fuel source 20 may impinge the baffle plate 54. As a result, larger particulate 46 may drop out of the combustion gas stream back toward the primary combustion zone 50 and reenter the combustion gas stream. The residence time of the larger particulate 46 in the combustion gas stream is increased which provides additional time for the larger particulate 46 to complete its combustion process.

The baffle plate 54 also prevents the combustion gas from going straight up through the chimney but rather provides a barrier to provide a circuitous flame path around the baffle plate 54. Since the natural vertical flame path is interrupted, mixing of oxygen rich air with oxygen starved air is encouraged. Additionally, since the length of the flame path is now increased, residence time of the combustion gas in the primary and secondary combustion zones 50, 48 is increased to promote more complete combustion and reduction of harmful emissions. Additionally, since the baffle plate 54 is tilted forward, the gas as well as the particulate 46 following such combusted gas stream is re-directed to the front of the improved fire grate 10 at the upper frame 32 where oxygen 44 is introduced to encourage more complete combustion and to reduce harmful emissions (e.g., particulate matter, carbon monoxide, etc.). It is contemplated that the baffle plate 54 may optionally be disposed slightly forward of the fuel source 20 such that a portion of the flames and combustion gas proceeds past the back of the baffle plate 54. Please note that the fresh oxygen rich air 44 may also be supplied to the back side via tubes 28a, 30a to aid in combustion of the such combustion gas and particulate.

Referring back to FIG. 2, the lower surface 60 of the baffle plate 54 may have channels 65 that extend horizontally from left to right. These channels may have a semicircular concave configuration as shown in FIG. 2 but other configurations (e.g., vertical, diagonal, etc.) are also contemplated. The channels 65 promote the gas to flow toward the perimeter (e.g., sides) of the improved fire grate 10. The combustion gas may be divided into two or more flame paths, namely, a portion of the combustion gas may proceed forward and around the front edge of the baffle plate 54. The combustion gas may flow outward toward the sides of the baffle plate 54 and around the baffle plate 54 to join up with the combustion gas that flowed past the front edge of the baffle plate 54. The separation and recombination of these flame paths encourage mixing of air above the baffle plate 54. A portion of the combustion gas stream may pass the rear edge of the baffle plate. This increases mixing action, increases particulate drop out and residence gas time within the primary and secondary combustion zones 50, 48. Alternatively, the channels 65 may extend vertically to route combustion gas to the front side of the upper frame 32. Additionally, through holes 67 may be formed through the baffle plate 54 that extend from the lower surface 60 and/or channels 65 to the upper surface 69 for the purposes of encouraging particulate removal and mixing of oxygen rich air with the oxygen starved air.

Referring now back to FIGS. 1 and 2, one or more fire sources 62 may be disposed at select locations within the secondary combustion zone 48. The fire sources 62 may be an elongate tube 64 with a plurality of holes 66 that may be directed outward. These elongate tubes 64 with holes 66 are supplied with combustible gas such as propane, natural gas, etc. via a system of tubes from a gas source. By way of example and not limitation, the fire sources 62 may be a log lighter sold under the trademark BLUE FLAME. The fire source 62a is shown in FIGS. 1 and 2.

Referring now to FIG. 9, two fire sources 62 may be disposed below the fire grate 10 (not shown for purposes of clarity). Each of the fire sources 62 may be in fluidic communication with one mixing chamber 79. Each of the mixing chambers 79 may be in fluidic communication with a manifold 92. The manifold 92 may have a flammable gas inlet 94 for receiving flammable gas via a conduit 96 connected to a flammable gas source 98. The fire sources 62 may have elongate tubes 64 with either aligned or straight holes 66 or staggered holes 66 as discussed herein. Each of the mixing chambers 79 may have an air conduit 93 that has an inlet 95 that is either directed to the side or downward. The inlet 95 receives air and introduces air into the mixing chamber. The mixing chambers 79 are in fluid communication with the manifold 92 by way of an orifice 97. The manifold 92 introduces flammable gas into the mixing chamber 79. Accordingly, the mixing chambers 79 mix air with flammable gas and introduce the mixed flammable gas/air into the elongate tubes 64. At the mixing chamber, the mixture of flammable gas and air is combustible. The air conduits 93 prevent embers or an ignition source from falling into the mixing chamber 79 and inadvertently igniting the flammable mixture in the mixing chamber 79 prior to entrance into the elongate tubes 64. As discussed above, the fire sources 62 are disposed below the fire grate 10. As such, the mixing chambers 79 are disposed closely adjacent to the biomass/fuel 20 being burned. Embers from the biomass/fuel source 20 may fall into the mixing chambers 79 without the air conduits 93. The air conduits 93 may have an elongate nature and the inlets 95 may be disposed away (e.g., distanced away, oriented sideways, oriented downward, etc.) from the biomass/fuel source 20. Falling embers hit the air conduits 93 and do not enter the mixing chambers 79.

Referring still to FIG. 9, the fire sources 62 may be disposed in an optimal position with respect to the fire grate 10. In particular, the flammable gas source 98 may have a half inch connection. A reducer 99 (e.g., ½" to as small as ¼") may be connected to the flammable gas source 98. The reduced sized conduit 96 (e.g., flex tubing, copper tubing, etc.) may be bent or shaped and connected to the flammable gas inlet 94 of the manifold 92. Accordingly, after the fire sources 62 are optimally placed with respect to the fire grate 10, the conduit 96 allows the fire sources 62 to remain in the optimal position, regardless of the position of the flammable gas source 98 on a vertical wall or a ground 90. Regardless of the left to right position or front to back position of the fire sources 62 as well as the vertical position of the flammable gas source 98, the bendable conduit 96 allows the fire sources 62 to be placed optimally with respect to the fire grate 10.

It is also contemplated that one mixing chamber 79 may be in fluid communication and control combustible gas flow to two or more fire sources 62.

Flammable gas (e.g., propane, natural gas, etc.) may be routed to the fire sources 62a, b via pipes 63 (see FIG. 1). During operation of the fireplace 14, the user may ignite the gas flowing out of the holes 66 of the elongate tube 64. The rapid ignition and additional heat increases the temperature in the primary combustion zone 50 to reduce harmful emissions and support additional combustion of flue gases. Additional fire sources 62 may also be disposed within the secondary combustion zone 48 such as at the rear (see fire source 62b in FIG. 1) of the combustion chamber 12 as well as the sides (not shown) of the combustion chamber 12. The BTU rating, location and flame hole distribution is to be determined based on test results. The fire sources 62 in the secondary combustion zone are optional.

The lower frame 34 may have a similar construction as that compared to the upper frame 32. The lower frame 34 may be fabricated from telescoping tubes 28c and 30c as well as telescoping tubes 28d and 30d. These respective tubes may have a frictional fit to fix the width 22 of the improved fire grate 10. It is contemplated that the tubes 28c, d and tubes 30c, d may or may not be in fluid communication with tubes 38a, 40a or tubes 38b, 42a. Fresh oxygen rich air 44 may flow through tubes 40a, 42a, 38a and 38b up to the upper frame 32. A crossbar 68 may be disposed over the tubes 28c, 30c and 28d, 30d. The biomass/fuel 20 may be laid across tube 40a, crossbar 68 and tube 42a to raise the biomass/fuel 20 above the ground. The tubular supports 38a, b along with retaining pipes 70a, b retain the biomass/fuel 20 on the lower frame 34. Two legs 72a, b may be attached (e.g., tack welded) to tubes 40a, 42a. Baffle plate 74a, b may be attached (e.g., tack welded or other means) to the tubes 28d, 30d to provide leg support at the front of the improved fire grate 10. The baffle plate 74a, b may also be fabricated from a refractory material or other material having good insulation characteristics. The baffle plates 74a, b may overlap one another and provide a semi-enclosed space behind the baffle plates 74a, b during operation, as shown in FIG. 1 so that a bed of embers or ash remains hot so as to (1) elevate the temperature or maintain a high temperature at the "coal" bed or in the primary combustion zone and (2) promote a more evenly hot "coal" bed—front to rear of the fireplace—promoting an "even" burn of the biomass/fuel above. A more even burn facilitates reduced emissions. The baffle plates 74a, b directs airflow coming through the fireplace opening 16 up and into the primary combustion zone 50 of the combustion chamber.

Figure 4A:
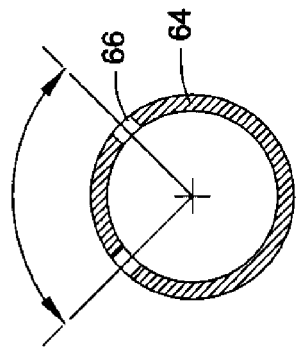
FIG. 4A is cross sectional view of an elongate tube of the log lighter shown in FIG. 4.
Figure 4:
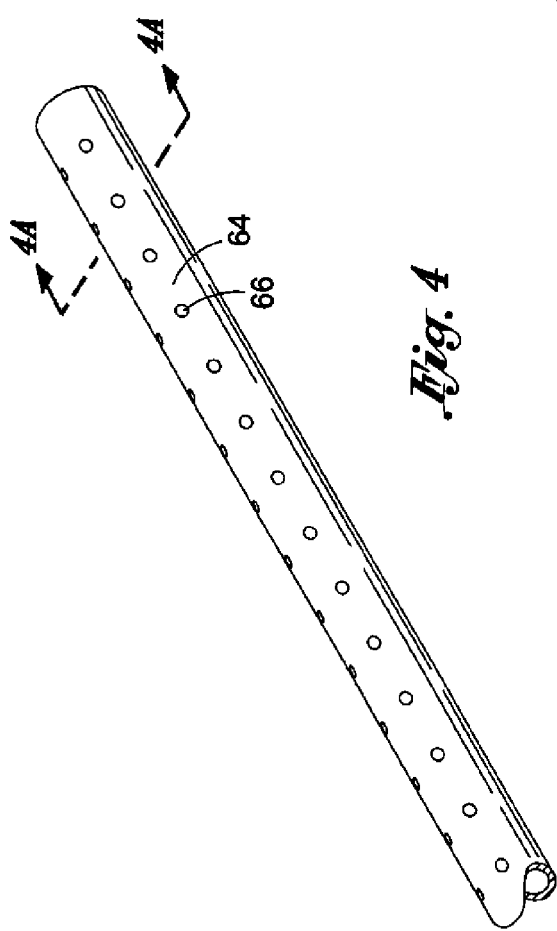
FIG. 4 is an enlarged view of a log lighter shown in FIG. 1 having aligned holes.
Figure 5:
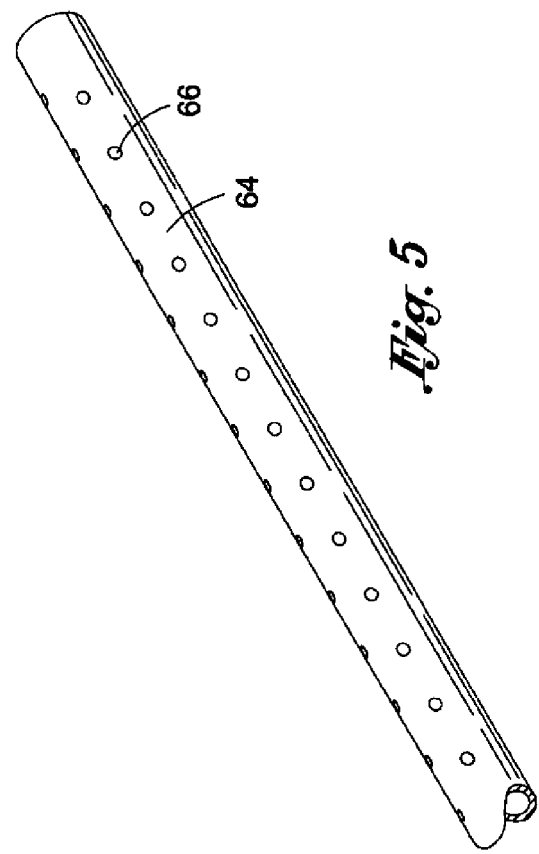
FIG. 5 is an alternate embodiment of the log lighter having staggered holes.

A fire source 62c may also optionally be disposed below the lower frame 34, as shown in FIG. 2. The fire source 62c may be an elongate tube 64 with a plurality of holes 66, as shown in FIGS. 4-5. The elongate tubes 64 may have a hollow configuration to allow gaseous fuel (e.g., propane, natural gas, etc.) to flow through the elongate tube 64 and out of the holes 66. This fire source 62c provides for rapid initial ignition of the biomass/fuel 20 and may be left on to supplement the combustion process for the entire time the biomass/fuel 20 is being burned to maintain a more efficient burning state. The additional fire source 62 assists in bringing new unburnt biomass/fuel (e.g., wood logs) to an efficient burning state. The holes 66 may be aligned (i.e., straight) to each other along a longitudinal length of the elongate tubes 64. These holes 66 may be oriented vertically upwards. Alternatively, the holes 66 may be staggered as shown in FIG. 5 along the length of the elongate tubes 64. The holes 66 may also be at a ninety (90) degree angle with respect to each other as shown in FIG. 4A and be directed in the generally upward direction as shown in FIG. 2. The fire source 62c may be disposed centrally below the lower frame 34 as shown in FIG. 2. It is also contemplated that two (2) fire sources 62d, e may be disposed below the lower frame 34 evenly distributed there below. The fire sources 62a, b disposed in the second stage 48 of the combustion chamber 12 may have the same configuration (e.g., straight, outwardly angled) as the fire sources 62c-e. The additional fire sources 62c-e and the staggered and outwardly angled holes 66 (see FIG. 5) of the fire sources 62c-e promote even heat distribution under the biomass/fuel 20 being burned.

It is also contemplated that an ash pan 76 may be disposed below the lower frame 34 and the fire source 62c, d, e. The ash pan 76 aids in the cleanup of the fireplace 14 after use.

Figure 6:
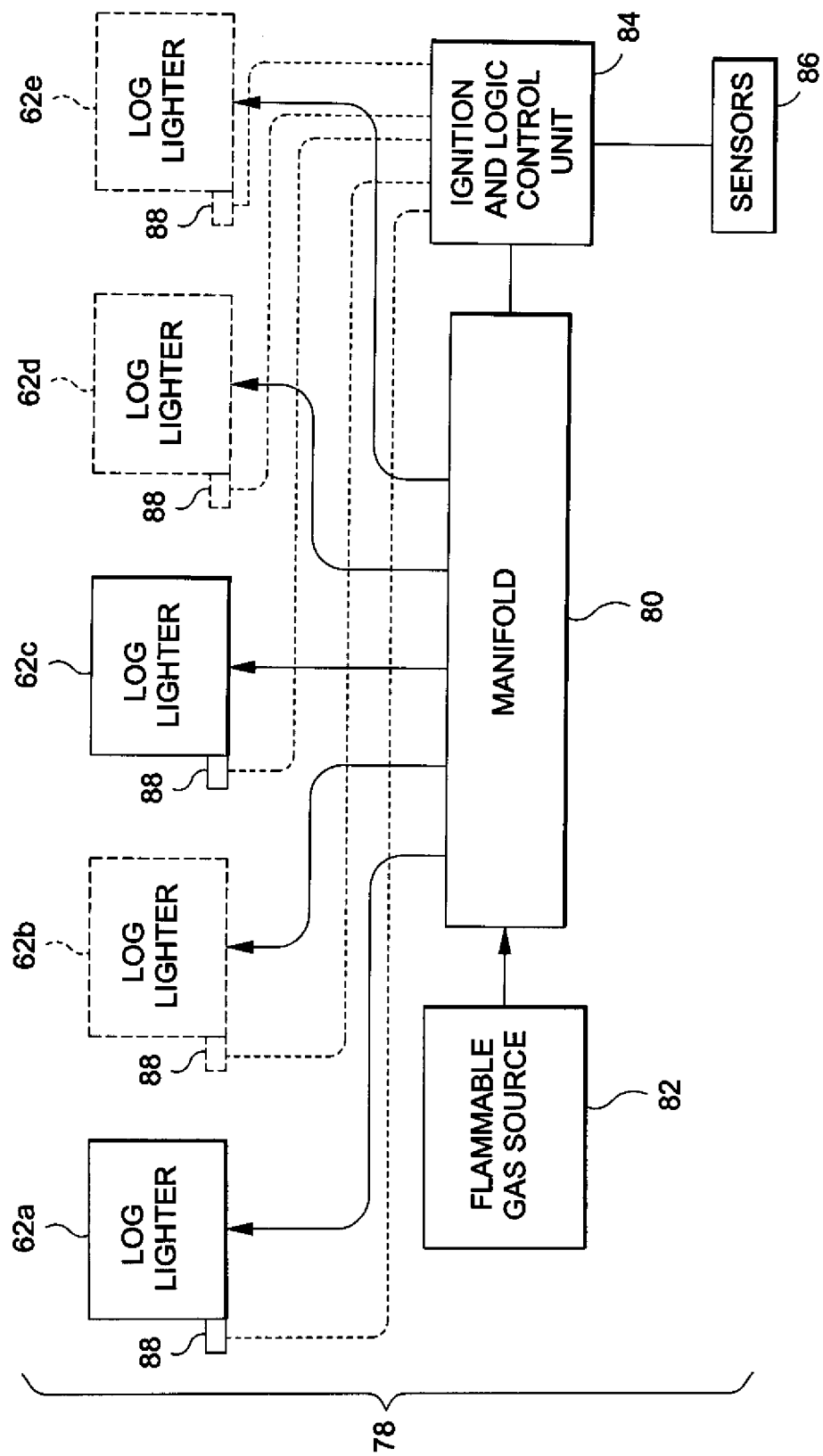
FIG. 6 is a schematic of an ignition system and logic control system.

Referring now to FIG. 6, an ignition system/logic control system 78 is contemplated. The log lighters 62a, b, c, d, e disclosed herein may be in fluid communication with a manifold 80 that receives flammable gas (e.g., propane, natural gas, etc.) from a flammable gas source 82. Based on the configuration of the improved fire grate 10 and the placement and number of heat sources 62a-e incorporated into the system, an ignition and logic control unit 84 which may be electro-mechanically connected to the manifold 80 opens and closes various valves to supply flammable gas to one or more of the log lighters 62a-e. Various sensors 86 (e.g., carbon monoxide sensor, temperature sensor, oxygen sensor, etc.) may be disposed within the combustion chamber 12, the room to be heated, the chimney, or at other various locations within or adjacent the fireplace 14 to measure the efficiency of the fireplace 14. Based on the sensed information, such sensed information may be transmitted to ignition and logic control unit 84 such that the appropriate amount of flammable gas is being supplied to one or more of the log lighters 62a-e. To light the log lighters 62a-e, an ignition switch 88 may be disposed adjacent the log lighter to provide a spark or initial pilot flame to the log lighter. Based on which log lighters 62a-e is to be ignited, the ignition and logic control unit 84 may send a signal to the ignition switch 88 to either start and leave on one or more of the log lighter 62a-e. To turn off one or more of the log lighters 62a-e, the ignition and logic control unit 84 may shut off supply of flammable gas to that particular log lighter 62a-e.

Still referring to FIG. 6, the heat sources 62a-e may be controlled by a manual push button switch 91. The user will place biomass/fuel source 20 on the fire grate 10. At this time, the user may push the push button switch 91 to activate the ignition and logic control unit 84. At this time, gas is provided to the pilot and the ignition switch 88 supplies a spark to supply pilot flame. The pilot flame is located at or near the path of flammable gas flow through the holes 66 in the elongate tubes 64. A thermocouple may recognize that the pilot flame is currently lit. Once the pilot flame is lit and recognized, the manifold 92 may feed flammable gas into one or more of the heat sources 62a-e as determined by the logic control unit 84. At this time, the pilot flame lights the gas flowing through the holes 66 of the elongate tubes 64 of each of the heat sources 62a-e. Once the flame of the heat sources 62a-e is recognized by way of a thermocouple or other device, gas to the pilot flame may be terminated. Preferably, the ignition and logic control unit 84 supplies flammable gas to the heat sources 62a-e by way of the manifold 80 for a set period of time (e.g., ten (10) minutes) to allow the biomass/fuel source 20 to burn at an efficient state. After this set period of time, the manifold 80 shuts off gas flow to one or more of the fire sources 62a-e as desired. By way of example and not limitation, the heat sources 62 disposed below the fire grate 10 are turned off after the set period of time. However, the other heat sources 62 disposed at other areas within the fireplace 14 may remain on to promote efficient burn as discussed herein. The logic control unit 84 may also shutoff gas flow to the heat sources 62a-e if a flame is not recognized by way of a thermocouple or other device.

The switch 91 may also have two different settings, namely, a manual setting which the operator must push or activate as discussed above and an automatic setting. In the automatic setting, the above procedure will occur when one or more of the sensor 86 (e.g., temperature) indicates that a condition exists in the fireplace that would benefit from the temporary or long term burning of one or more of the fire sources. By way of example and not limitation, a temperature sensor 86 may indicate a low temperature reading within the fireplace 14. The user may place a biomass/fuel source on the fire grate 10. A sensor 86 may detect the presence of the biomass/fuel source and temporarily turn on one or more of the fire sources 62 disposed below the fire grate 10 and/or the other fire sources 62 disposed at other locations. Conversely, in the automatic setting, the logic control unit 84 may shut off gas flow to one or more of the fire sources 62 when one or more of the sensors 86 indicate efficient burning of the biomass/fuel source 20.

Figure 7:
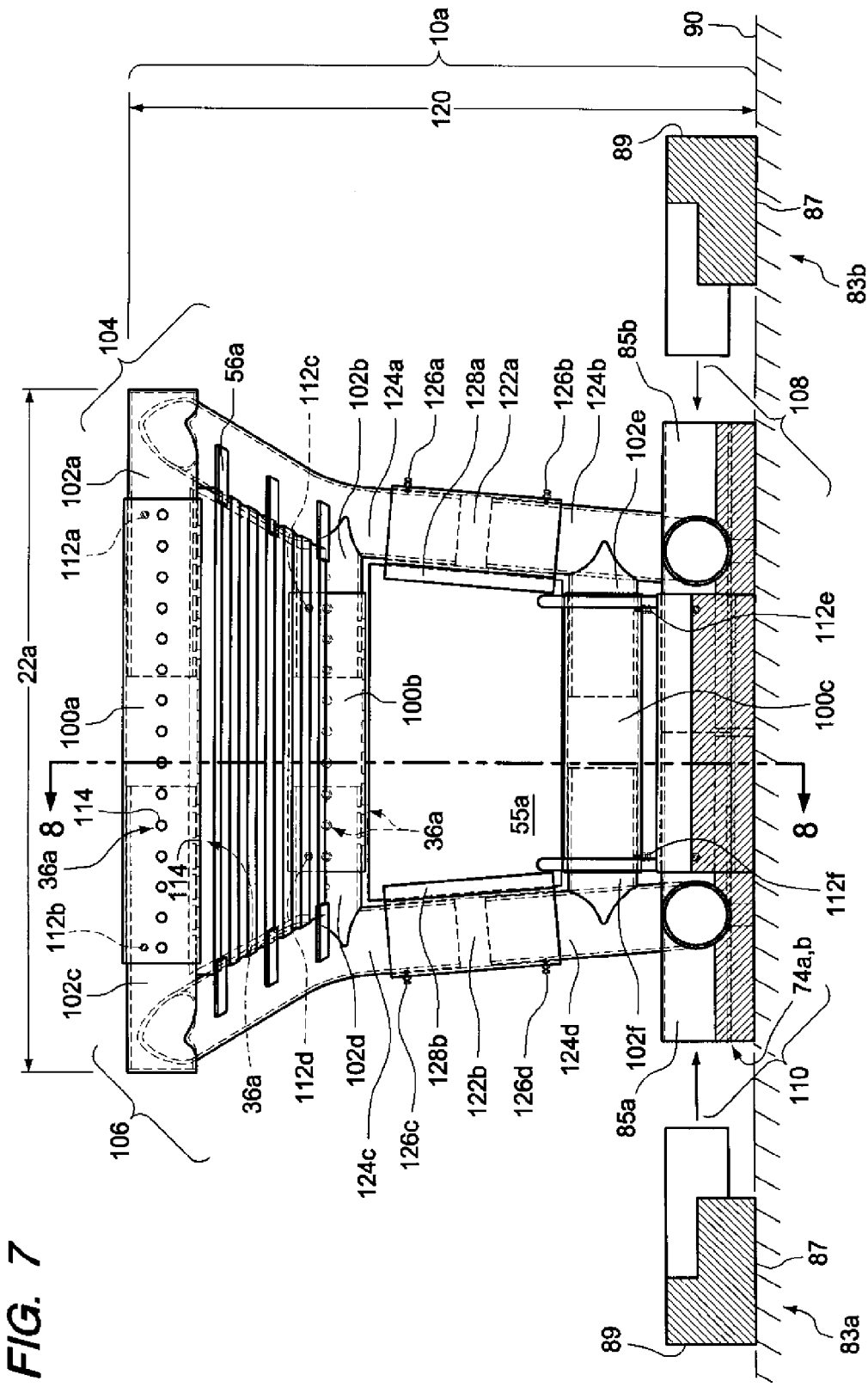
FIG. 7 is a front view of a second embodiment of the improved fire grate.
Figure 8:
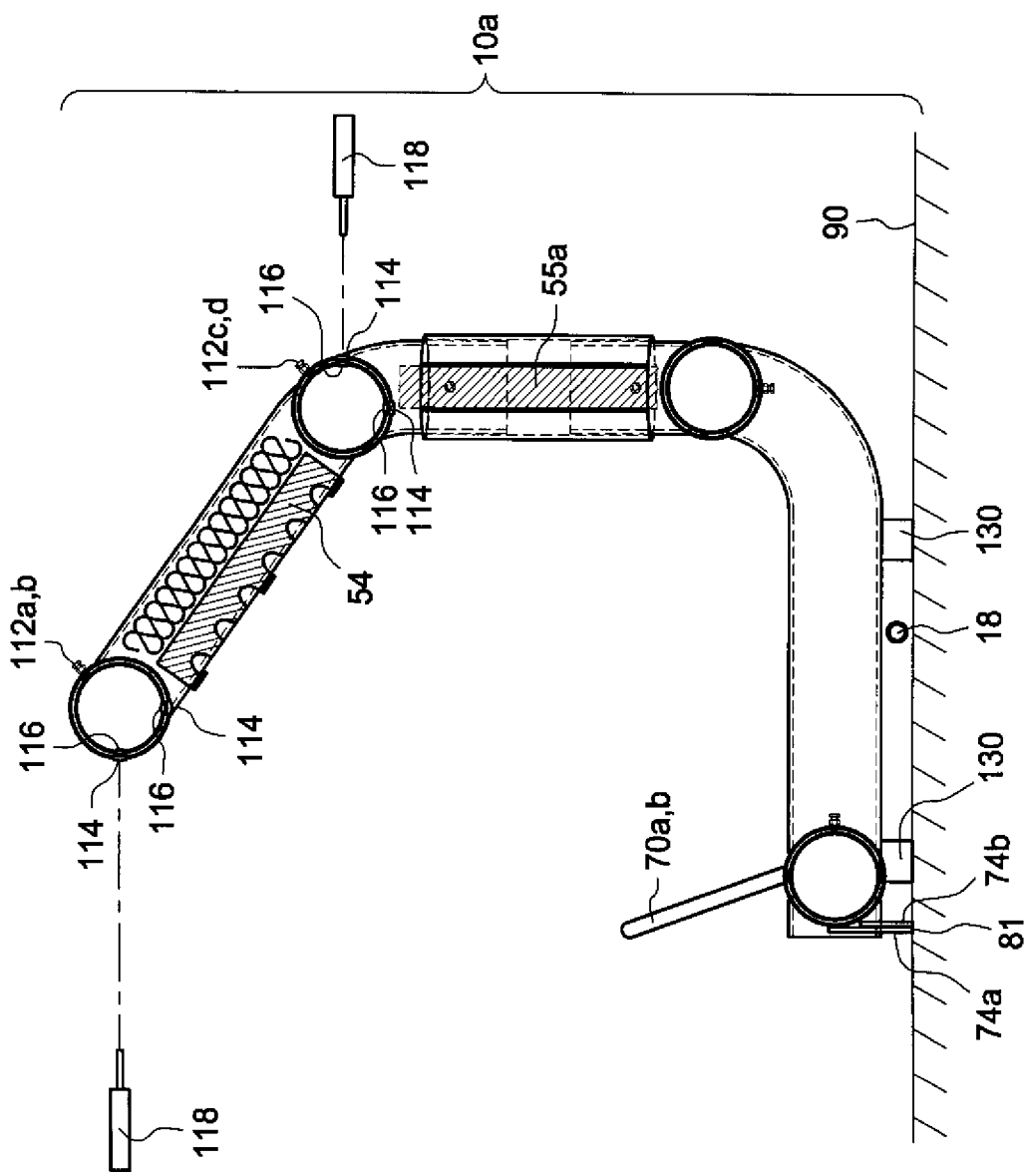
FIG. 8 is a cross sectional view of the improved fire grate shown in FIG. 7.

Referring now to FIGS. 7 and 8, a second embodiment of the improved fire grate 10*a* is shown. The improved fire grate 10*a* may be vertically and horizontally expanded or contracted so as to be sized and configured to fit within one of a plurality of different fireplace sizes. It is contemplated that the improved fire grates 10, 10*a* may be fabricated and provided to the public in a small range size, medium range size and a large range size. The height and width of the improved fire grate 10, 10*a* may be adjusted to fit within the combustion chamber 12 of the fireplace 14.

To this end, the improved fire grate 10*a* may be expandable in the horizontal direction similar to the fire grate 10 discussed above. In particular, the improved fire grate 10*a* may have one or more horizontal expansion sleeves 100*a*, *b* and *c*. The horizontal expansion sleeves 100*a*, *b*, *c* may be sized and configured to snugly receive horizontal tubes 102*a*, *b* of the upper right section 104 and horizontal tubes 102*c*, *d* of the upper left section 106 of the improved fire grate 10*a*. The horizontal expansion sleeve 100*c* may be sized and configured to snugly receive horizontal tubes 102*e, f* of the lower right section 108 and lower left section 110 of the improved fire grate 10*a*. The horizontal tubes 102*a-f* may be slid into and out of the horizontal expansion sleeves 100*a-c* to fit the improved fire grate 10*a* horizontally within the combustion chamber 12 of the fireplace 14. Once the width 22*a* of the improved fire grate 10*a* is adjusted to the width of the combustion chamber 12 of the fireplace 14, set screws 112*a*, *b*, *c*, *d* are engaged such that the width 22*a* of the improved fire grate 10*a* does not change during use. In particular, the horizontal expansion sleeves 100*a, b* may have a threaded through hole which receives the set screws 112*a-d*. The set screws 112*a-d* engage the exterior surfaces of the horizontal tubes 102*a-d* such that the horizontal tubes 102*a-d* cannot slide within the expansion sleeves 100*a-b* once set.

The horizontal expansion sleeves 100*a, b* may have holes 114 equidistantly spaced apart from each other (e.g., 1" apart). A first set of holes may be oriented to blow air horizontally forward as shown in FIG. 8. A second set of holes 114 may be oriented to blow air directly downward as shown in FIG. 8. The downwardly directed holes 114 may also be equidistantly spaced apart from each other (e.g., 1"). Moreover, the downwardly directed holes 114 may be offset from the forwardly directed holes 114 (e.g., ½"), as shown in FIG. 7. Holes 114 and 116 may be formed in expansion sleeve 100*b* and horizontal tubes 102*b, d* in a similar fashion as the holes 114, 116 in expansion sleeve 100*a* and tubes 102*a, c*. As shown in FIG. 8, one set of holes 114, 116 are oriented rearward of the improved fire grate 10*a* and one set of holes 114, 116 are oriented downward. When the width 22*a* in the improved fire grate 10*a* is adjusted, the width 22*a* is adjusted by the spacing of the holes 114, 116. In this example, the width 22*a* of the improved fire grate 10*a* is adjustable in 1" increments. The reason is that for air to blow out of the holes 114, 116 which form the air outlet holes 36*a*, the holes 114, 116 must be aligned to each other. To align the holes 114, 116, a pin 118 may be inserted into the holes 114, 116 prior to engagement of the set screws 112*a*, *b* and 112*c*, *d*.

Once the width 22*a* of the fire grate 10*a* is set, the horizontal height 120 is adjusted. To this end, the improved fire grate 10*a* may have vertical expansion sleeves 122*a*, *b*. The upper right section 104 and the lower right section 108 of the improved fire grate 10*a* may have vertical tubes 124*a*, *b* that are sized and configured to be received within the vertical expansion sleeve 122*a*. Likewise, the upper left section 106 and the lower left section 110 may have vertical tubes 124*c, d* which are sized and configured to be received into the vertical expansion sleeve 122*b*. To adjust the height 120 of the improved fire grate 10*a*, the tubes 124*a-d* are slid into and out of the expansion sleeves 122*a*, *b* until the appropriate height 120 of the improved fire grate 10*a* is achieved. Preferably, the height 120 of the fire grate 10*a* is sized and configured to fit within the combustion chamber 12 of the fireplace 14. As the tubes 124*a-d* are slid into and out of the vertical expansion sleeves 122*a*, *b*, the tubes 102*e, f* are also slid into and out of the horizontal expansion sleeve 100*c* since the tubes 124*a-d* are skewed and not parallel with each other. As such, when the width 22*a* of the improved fire grate 10*a* is being adjusted, set screws 112*e, f* are not set. The tubes 102*e, f* are allowed to slide into and out of the expansion sleeve 100*c*. After the height 120 of the improved fire grate 10*a* is adjusted, the set screws 112*e, f* are engaged. Additionally, set screws 126*a-d* are set to prevent movement of the tubes 124*a-d* within vertical expansion sleeves 122*a*, *b*.

The tubes 102*a-f* may be sized and configured to snugly fit within expansion sleeves 100*a-c*. However, it is also contemplated that the reverse orientation is possible. The expansion sleeves 100*a-c* may be slid into the tubes 102*a-f*. The same is possible with the vertical expansion sleeves 122*a*, *b*. Also, preferably, there is no more than ¹⁄₃₂" gap between the expansion sleeves 100*a-c* and tubes 102*a-f* as well as between tubes 124*a-d* and expansion sleeves 122*a*, *b*. For example, the outer diameter of the tubes 102*a-f* and tubes 124*a-d* may be no more than ¹⁄₁₆" smaller than the inner diameter of the expansion sleeves 100*a-c* and vertical expansion sleeves 122*a-b*. It is also contemplated that a fire resistant putty may be disposed about the periphery of the distal ends of the expansion sleeves 100*a*, *b* and expansion sleeves 122*a*, *b* prevent leakage of air.

Baffle plate 55*a* may be disposed at the rear of the improved fire grate 10*a*. To this end, a U-channel 128*a*, *b* may be attached to medial sides of the expansion sleeves 122*a*, *b*. The baffle plate 55*a* may be slid into the U-channels 128*a*, *b* to hold the same in place during use. To adjust the width and height of the baffle plate 55*a*, the baffle plate 55*a* may be provided to the consumer in an oversized state. Once the appropriate height 120 and width 22*a* of the improved fire grate 10*a* is achieved, the consumer may cut the baffle plate 55*a* to size. The same is also possible for baffle plates 54 which are suspended via tabs 56*a* (refractory tabs).

Referring now to FIG. 8, baffle plates 74*a*, *b* (deflector plates) are shown. The baffle plates 74*a*, *b*, and more particularly, a lower edge 81 of the baffle plates 74*a*, *b* extend to the ground of the fire box of the fireplace 14 to mitigate air from flowing in front of the baffle plates 74*a*, *b* to the rear of the baffle plates 74*a*, *b*. To further mitigate air transfer in front of to the rear of the baffle plates 74*a*, *b*, baffle plate extensions 83*a*, *b* (see FIG. 7) may be slid into pipes 85*a*, *b* and adjusted to overlap the baffle plates 74*a*, *b*. The lower edges 87 of the baffle plate extensions 83*a*, *b* may extend to the ground of the fire box to prevent flow of air underneath the baffle plate extensions 83*a*, *b*. Additionally, the baffle plate extensions 83*a*, *b* may be extended outwardly such that lateral edges 89 may extend to side surfaces of the fire box of the fireplace 14.

As such, the baffle plates 74a, b and the baffle plate extensions 83a, b form a barrier to prevent flow of air underneath and around the sides of the baffle plates 74a, b for promoting a more even distribution of heat by the embers of the biomass/fuel dropping onto the floor of the firebox. The front of the "coal" bed is not cooled by an air draft. The improved fire grate 10a may be suspended above the ground via spacers 130 having a height sufficient to allow the heat source 18 between the improved fire grate 10a and the ground. Retaining members 70a, b are also shown. Referring now to FIG. 8, the set screws 112 are not protruding out of the backside of the improved fire grate 10, 10a. As such, the improved fire grate 10, 10a may be backed up and contact the backside of the combustion chamber 12.

Referring now to FIGS. 10-13, a second embodiment of the mixing chamber 79a is shown. The two mixing chambers may be in fluid communication with a manifold 92a by way of orifices 97a (see FIG. 11). Flammable gas is introduced into the manifold 92a through flammable gas inlet 94a. The flammable gas is then flowed through into the mixing chamber 79a which is combined with fresh air through air inlets 132 and 134. The air inlets 132 may be threaded to allow attachment of an air conduit 93 that can be directed toward the front of the fireplace 14 so that fresh air may be flowed into an air chamber 136 (see FIG. 11). In contrast to the embodiment shown in FIG. 9, it is contemplated that one of the two air inlets 132 may be plugged with an air conduit attached to the unplugged air inlet 132. The determination of which air inlet 132 to plug and which air inlet 132 to attach to an air conduit 93 is dependent on the orientation of the mixing chamber 79a. Preferably, the unplugged air inlet 132 is directed to a front open space of the fireplace 14. The air conduit 93 may be attached to the unplugged air inlet 132 and may provide fresh air into both of the mixing chamber 79a by way of the common air chamber 136. Air flow paths 138 are shown in FIG. 11.

Figure 12:
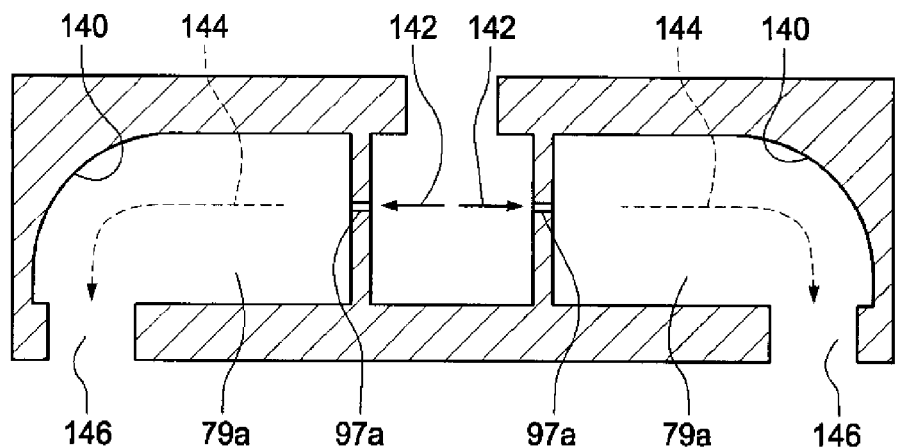
FIG. 12 is a cross sectional view of the second embodiment of the mixing chamber shown in FIG. 11.

Referring now to FIG. 12, the mixing chamber 79a may have curved back surfaces 140. As flammable gas flows through the orifices 97a in the direction of arrows 142, the flammable gas enters the mixing chamber 79a and mixes with fresh air introduced into the mixing chamber 79a by way of air inlets 134 (see FIG. 11). The mixed air/flammable gas is flowed through the mixing chamber 79a in the direction of arrows 144. The curved back surfaces 140 are optional and are meant to assist in providing less turbulence by guiding the mixture to the mixed flammable gas/air outlets 146 that may be connected to the fire sources 62.

Figure 13:
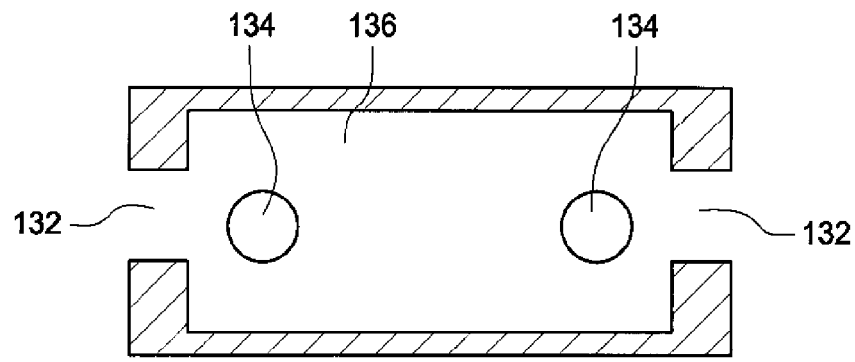
FIG. 13 is a cross sectional view of the second embodiment of the mixing chamber shown in FIG. 12.
Figure 14:
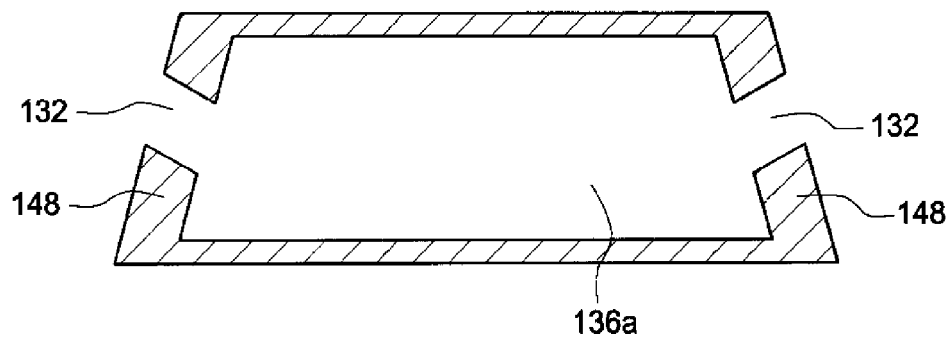
FIG. 14 is an alternate embodiment of an air chamber shown in FIG. 13.

Referring now to FIG. 13, fresh air may enter the air chamber 136 by way of air inlets 132. It is contemplated that one of the air inlets 132 may be plugged while the other air inlet is attached to an air conduit 93. It is also contemplated that both of the air inlets 132 are unplugged with two separate air conduits attached to the air inlets 132. After air enters the air chamber 136 by way of the air inlets 132, the air is introduced into the mixing chamber 79a by way of air inlets 134. Referring now to FIG. 14, an alternate embodiment of the air chamber 136 is shown. In particular, air chamber 136a may have a trapezoidal configuration. Sidewalls 148 may be skewed so that air conduits 93 that are attached to one or both of the air inlets 132 can be directed toward the side as shown in FIG. 9.

The tubular supports 38a, b, vertical tubes 124a, b and sleeves 122a, b have been shown as being generally round tubes. However, it is also contemplated that these tubes 38a, b, 124a, b, 122a, b may also be square, rectangular or other configurations. A generally flatter rectangular tube will allow the wood to be placed further back on the fire grate.

Referring back to FIGS. 5 and 9, the elongate tubes 64 of the fire sources 62 may have staggered holes 66. A first hole 66a of the staggered sets of holes 66 may be approximately ¾" away 65 from a distal end of the elongate tube 64. The next closest hole 66b which is staggered approximately 90° away (see FIG. 4B) from the hole 66a and may be approximately ⅛" away 67 from the distal end from the elongate tube 64. The holes 66 may have an inner hole diameter of about 0.0860" which may be formed by a number 44 drill bit. There may be a total of fifty (50) holes 66. Twenty-five (25) holes 66 may be formed on one side of the elongate tube 64. Twenty-five (25) holes may be formed on the other side of the elongate tubes 64 and staggered from the holes 66 on the one side. The elongate tubes 64 may be approximately 20" long and have a distance 69 parallel to each other about 4½" apart. The holes on one side of the elongate tubes 64 may be approximately ¾" apart 71 from each other. Additionally, the holes 66 on the other side or the other staggered set of holes 66 may be approximately ¾" apart 71 from each other as well.

Figure 15:
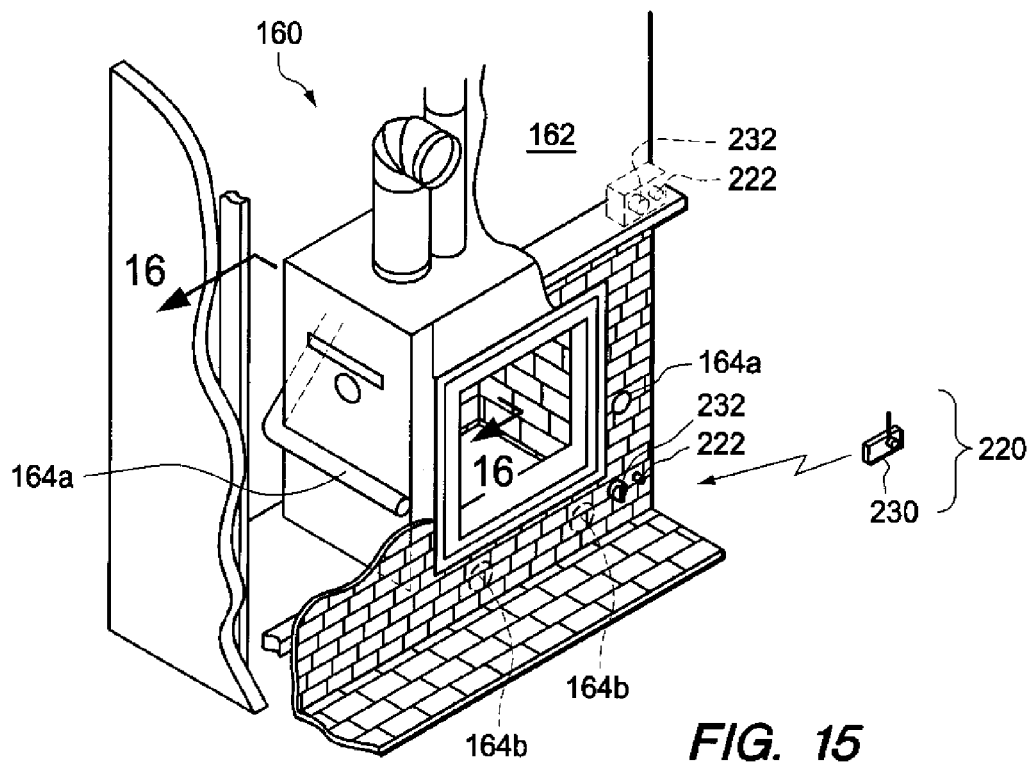
FIG. 15 is a perspective view of a pre-fabricated fireplace incorporating various aspects of the improved fire grate.
Figure 16:
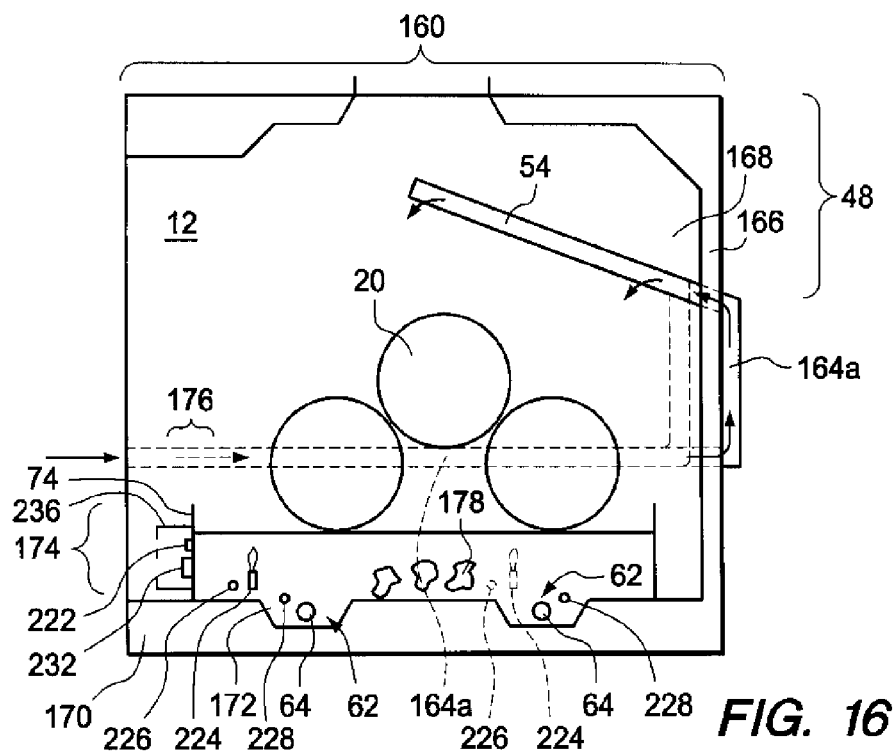
FIG. 16 is a cross sectional side view of the pre-fabricated fireplace shown in FIG. 15.
Figure 16A:
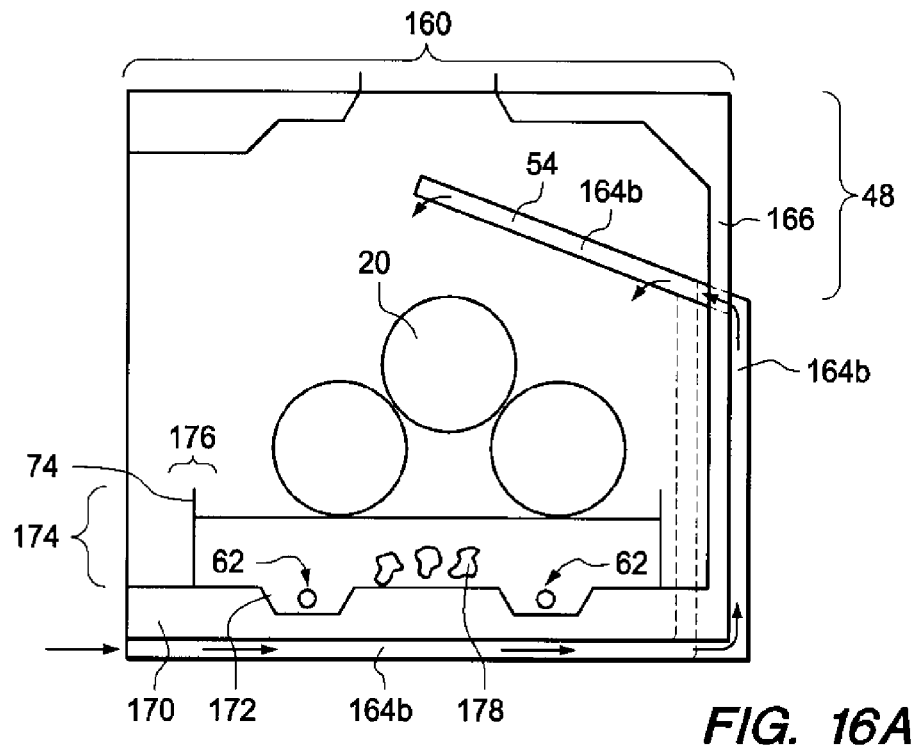
FIG. 16A is an alternate embodiment of the pre-fabricated fireplace shown in FIG. 16.
Figure 16B:
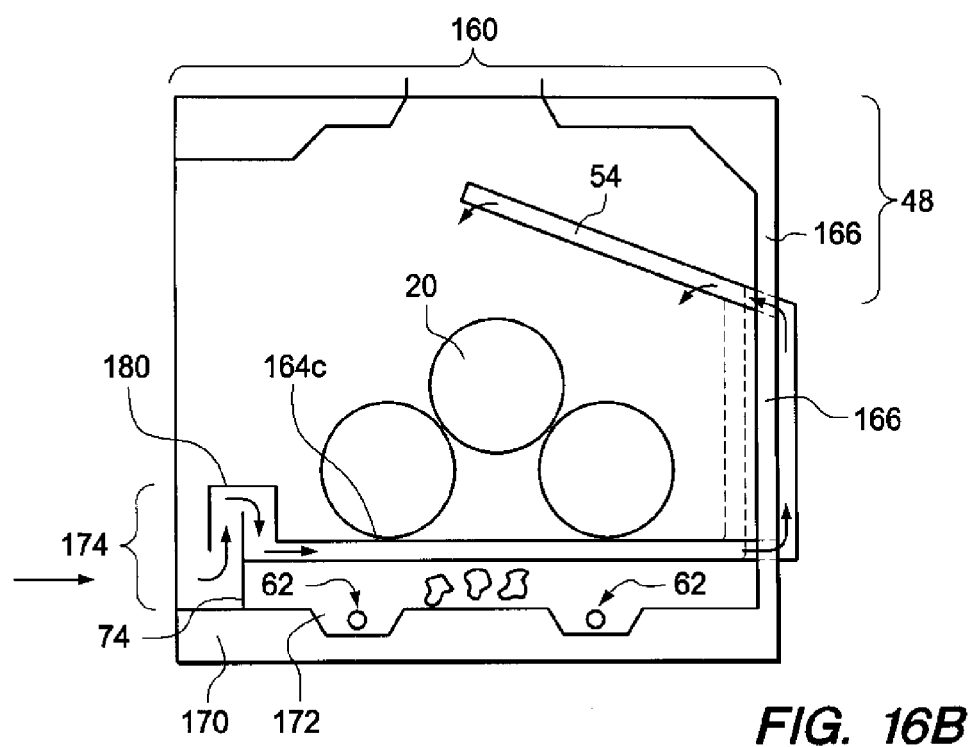
FIG. 16B is a further alternative embodiment of the pre-fabricated fireplace shown in FIG. 16.

Referring now to FIG. 15, a pre-fabricated fireplace 160 is shown. The pre-fabricated fireplace 160 may be inserted into a wall 162 of a building or other pre-designated area for the pre-fabricated fireplace 160 within the building. Air conduits 164a may be routed on lateral sides of the pre-fabricated fireplace 160, as shown in FIGS. 15 and 16 as well as through other routes (see FIGS. 15, 16A and 16B) for hiding the air conduits from the user's view. The air conduits 164 bring in fresh air from outside of the pre-fabricated fireplace 160 and route the fresh air to the secondary combustion zone 48, as shown in FIGS. 16-16B. This provides additional oxygen to unburnt particulate so as to complete the burning process for that particulate. The air conduits 164 may direct air in the same direction as that described in relation to FIGS. 1 and 2.

Referring now to FIG. 16, the air conduits 164a may be routed on the sides of the fireplace 160 to hide the air conduits 164a from the user's view. Moreover, the air conduits 164 may be routed to the backside of the pre-fabricated fireplace 160, as shown in FIG. 16. The air conduits 164a may be routed upward and may penetrate through a wall 166 of the pre-fabricated fireplace 160 so that the air conduit 164a may direct air or oxygen to the secondary combustion zone 48. The air conduits 164a are shown as being routed from the sides of the pre-fabricated fireplace 160 to the back side of the pre-fabricated fireplace 160. However, it is also contemplated that the air conduits 164a may be routed from the sides of the pre-fabricated fireplace 160, extend upward (see dash lines in FIG. 16), then penetrate the side wall 168 of the pre-fabricated fireplace 160 to route the air conduit 164a to the secondary combustion zone 48 to allow air or oxygen to be routed thereto. This alternative embodiment is shown in dash lines in FIG. 16.

Baffle plate 54 discussed above may be mounted to the air conduits 164a and be positioned above the burning biomass/fuel source 20 at the secondary combustion zone 48 so that rising gas may hit the baffle plate 54 and mix the stratified layers of gas and air within the rising gas. Additionally, particulate floating within the rising gas may hit the baffle plate 54 and come out of the rising gas stream then fall back toward the burning biomass/fuel source 20 to promote a more complete burn of unburnt particulate. The baffle plate 54 may also incorporate through holes 67 as discussed above.

Additionally, a bottom floor 170 of the pre-fabricated fireplace 160 may have an elongate recess 172 which is sized and configured to receive the elongate tubes 64 of the fire sources 62. The fire sources 62 are hidden from the user's view. The recesses 172 may extend side to side but may also be formed to extend front to back. The grate 174 may be disposed over the fire sources 62 and be sized and configured for supporting the burning biomass/fuel source 20. A front area 176 of the grate 174 may have baffle plates 74 that extend laterally across the front of the pre-fabricated fireplace 160 to keep the burning embers and unburnt particulate warm or hot that drop onto the bottom floor 170. The bed of embers 178 remain hot and is not cooled down by air that might flow under or laterally around the grate 174 but for the baffle plates 74. Additional fire sources 62 may be disposed in the secondary combustion zone 48 as discussed above. These additional fire sources 62 may be configured similar to the fire sources 62c, d discussed here including but not limited to mounting configuration, gas line routing, flame direction, etc. The gas line that feeds the additional fire sources 62 to the secondary combustion zone 48 may also be hidden in the same manner as the air conduits as discussed herein.

Referring back to FIGS. 15 and 16A, the air conduits 164b may be routed under the bottom floor 170 to the back side of the fireplace 160 where the air conduit 164b may penetrate the back wall 166 to route air or oxygen into the secondary combustion zone 48 to promote a cleaner burn of the biomass/fuel source 20. In this embodiment, the conduit 164b is also hidden from the user's view. Fire sources 62 may be disposed within recesses 172 formed in the bottom floor 170—side to side or front to back. A front area 176 of the grate 174 may have baffle plates 74 that extend laterally across the front of the pre-fabricated fireplace 160 to maintain the temperature of the bed of embers 178 that form under the grate 174. Baffle plate 54 may be mounted to the air conduit 164b. The air conduit 164b may also be routed internally into the fireplace 160 at the rear as shown by the dash lines in FIG. 16A.

Referring now to FIG. 16B, the air conduit 164c may be routed internally through the pre-fabricated fireplace 160. The air conduit 164c may be incorporated into the grate 174. In this embodiment, the conduit 164c is also hidden from the user's view. The grate 174 may additionally have baffle plates 74 that extend laterally across the front of the fireplace 160. A top cover 180 may extend over the baffle plates 74 and form a part of the air conduit 164c. The air conduits 164c may also support the biomass/fuel source 20 thereon. The air conduit 164c may penetrate the back wall 166, be routed upward then penetrate the back wall 166 back into the fireplace 160 so that the air conduit 164c may provide fresh oxygen to the secondary combustion zone 48. Also, baffle plate 54 may be attached to the air conduit 164c at the secondary combustion zone 48 to increase the time, temperature and turbulence unburnt particulate remains in the combustion chamber to promote fireplace efficiency. Additionally, fire sources 62 may be disposed within recesses 172 formed in the bottom floor 170. The recesses 172 may be formed side to side as shown or front to back.

Figure 17:
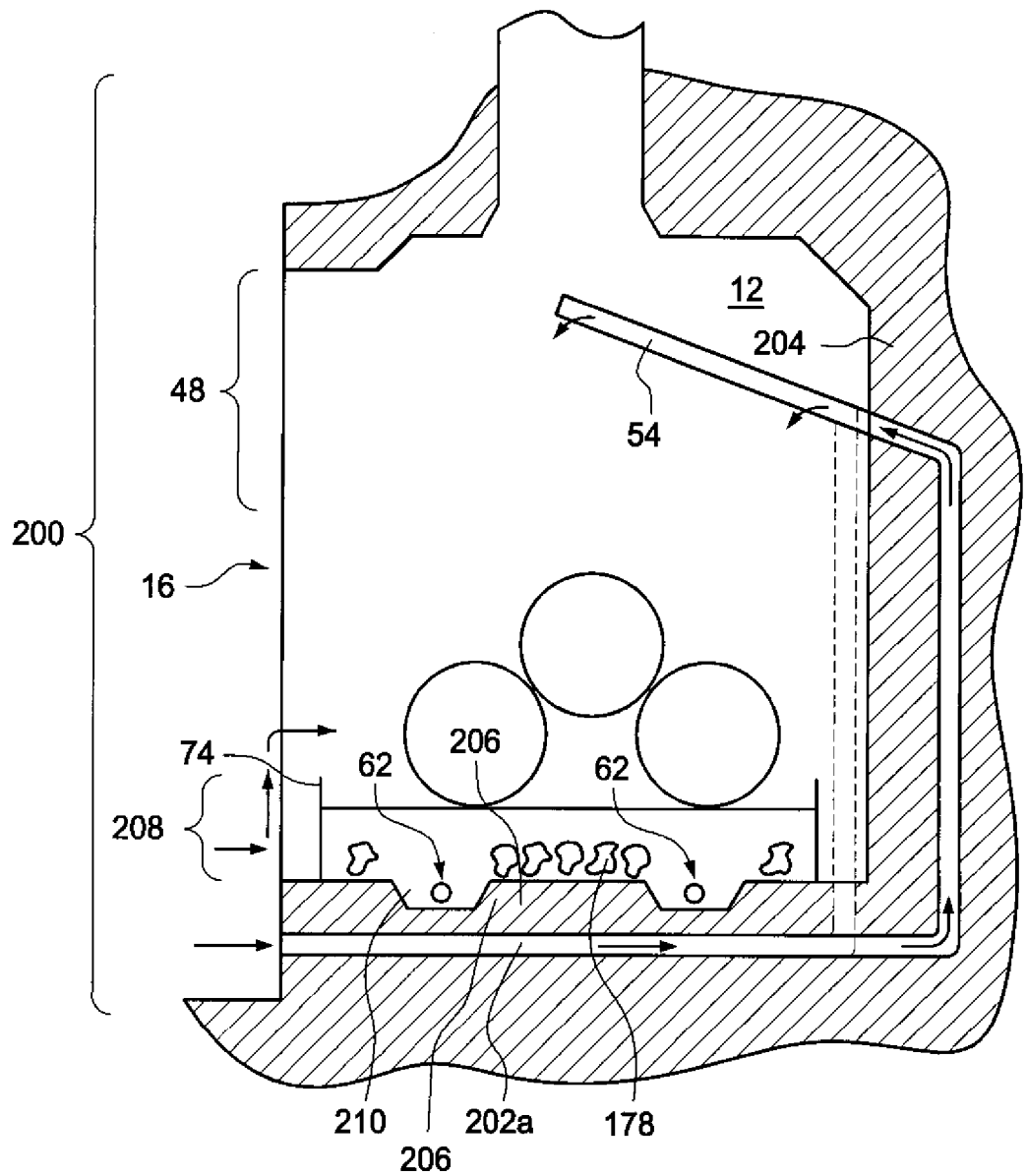
FIG. 17 is a side cross sectional view of a traditional masonry fireplace incorporating the various aspects of the improved fire grate.
Figure 17A:
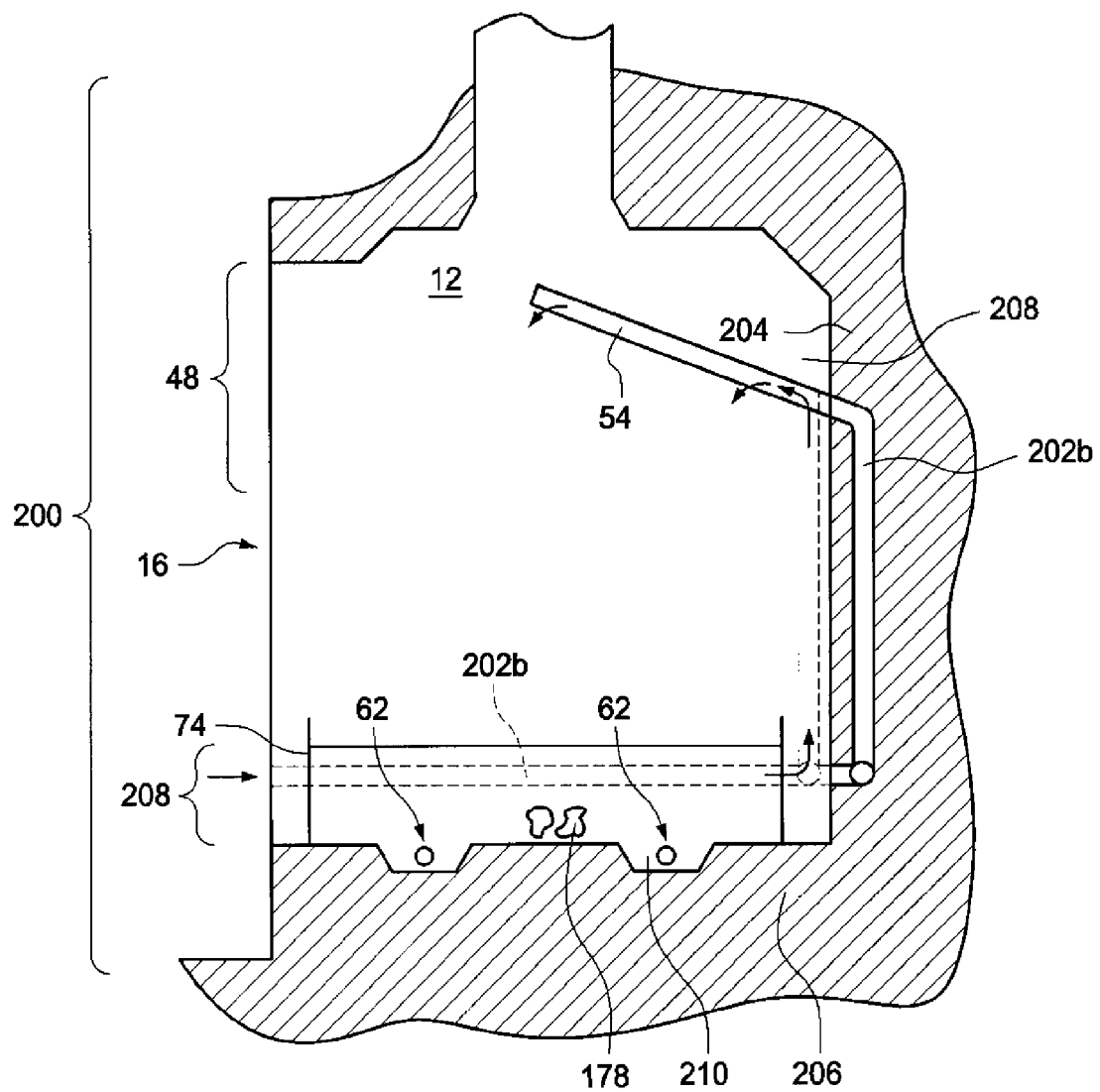
FIG. 17A is an alternate embodiment of the masonry fireplace shown in FIG. 17 incorporating various aspects of the improved fire grate.
Figure 17B:
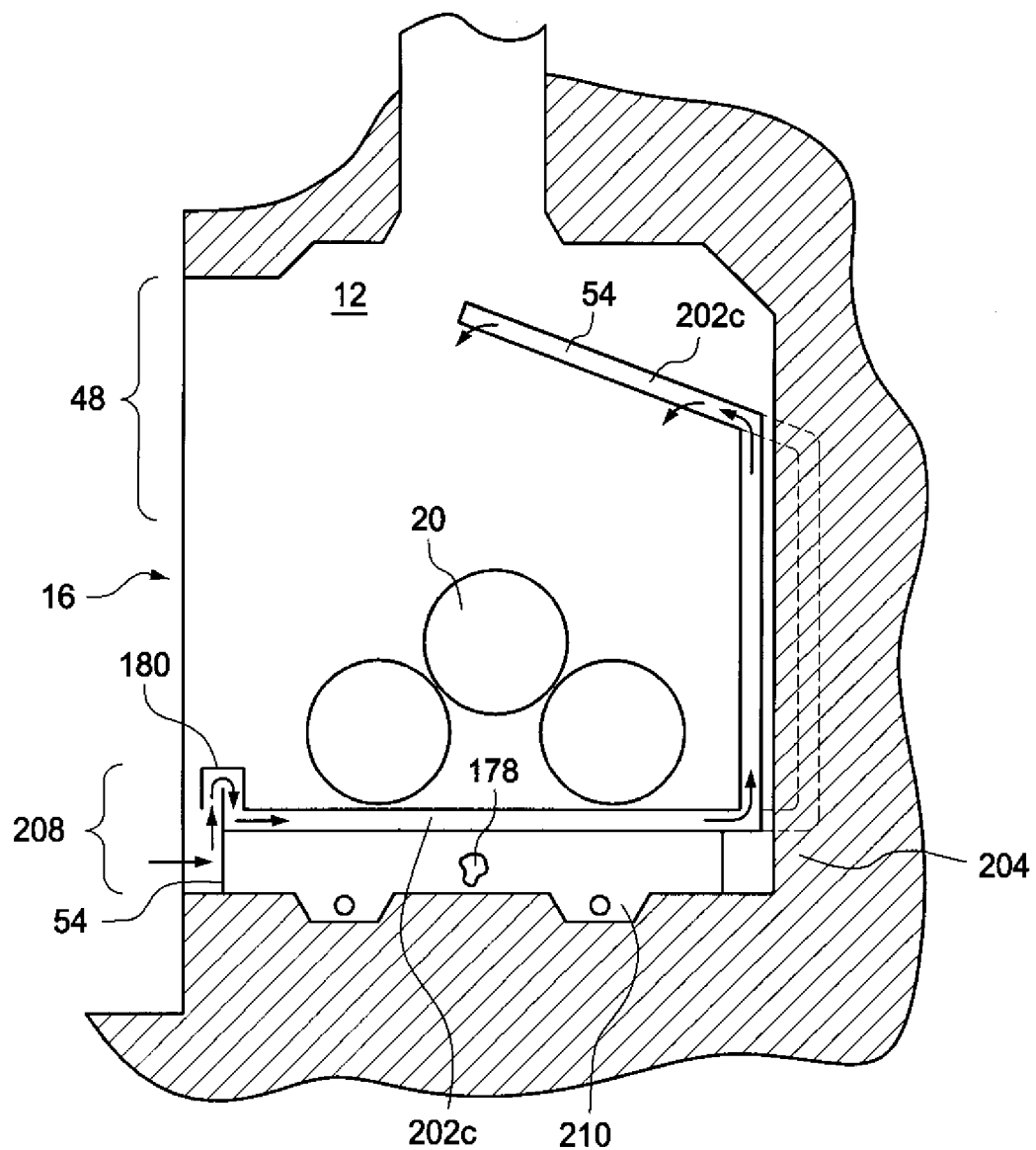
FIG. 17B is a further alternative embodiment of a masonry fireplace incorporating various aspects of the improved fire grate.

Referring now to FIGS. 17-17B, a masonry fireplace 200 with hidden air conduits 202a, b, c is shown. An air conduit 202a may be routed underneath the combustion chamber 12, behind the combustion chamber 12 and penetrate a back wall 204 of the fireplace 200 so that the air conduit 202a may route fresh air to the secondary combustion zone 48 without being seen by the user. Additionally, the floor 206 may have elongate recesses 210 formed side to side as shown or front to back for receiving fire sources 62 for the purpose of hiding the fire sources 62 from view of the user. Additionally, the fire grate 208 may have a baffle plate 74 that may extend laterally across the front of the opening 16 so that cold air does not pass below or laterally around the fire grate 208 to cool the bed of embers. A baffle plate 54 may also be attached to the air conduit 202a at the secondary combustion zone 48 of the combustion chamber 12. The air conduit 202a may be routed underneath the combustion chamber 12 and penetrate the floor 206 and extend upward as shown by the dash lines in FIG. 17.

Referring now to FIG. 17A, the air conduit 202b may be routed to the lateral sides of the masonry fireplace 200 as shown in FIG. 17A. The air conduit 202b may extend to the back wall 204, be routed upward and penetrate the back wall 204 to allow the air conduit 202b to provide fresh air or oxygen to the secondary combustion zone 48. Alternatively, the air conduit 202b may be routed back then upward and penetrate sidewall 208 to the secondary combustion zone 48. The floor 206 may have a recess 210 formed side to side as shown or front to back for receiving the fire sources 62. The recesses 210 hide the fire sources 62 from the user's view. The grate 208 may have a baffle plate 74 that extends laterally across the opening 16 to prevent cool air from cooling down the bed of embers 178 that fall below the grate 208. The baffle plate 74 blocks cool air from flowing under the baffle plate 74 or laterally around baffle plate 74. Additionally, a baffle plate 54 may be attached to the air conduit 202b that enters the combustion chamber 12 at the secondary combustion zone 48.

Referring now to FIG. 17B, the masonry fireplace 200 may incorporate a fire grate 208 that includes air conduit 202c. The grate 208 may have a baffle plate 74 that extends across the opening 16 to mitigate cool down of the bed of embers 178 that fall below the grate 208. The baffle plate 74 mitigates entry of cool air below or laterally around the baffle plate 74. The grate 208 may include a cover 180 that forms a part of the air conduit 202c. The tubes that form the air conduit 202c may also double as a support for the biomass/fuel source 20. The air conduit 202c may extend to the back side of the combustion chamber 12, be routed upward and provide fresh air or oxygen to the secondary combustion zone 48. Alternatively, the air conduit 203c may penetrate the back wall 204, be routed upward and re-penetrate the back wall 204 into the secondary combustion zone 48 to supply fresh oxygen to facilitate burning of unburnt particulate. Also, baffle plate 54 may be attached to air conduit 202c to increase temperature, time and turbulence as discussed herein.

Referring back to FIGS. 15 and 16, the pre-fabricated fireplace 160 may have an ignition system 220. The ignition system 220 may include a push button switch 222 that may provide an ignition source to a pilot light 224 when starting the fireplace 160. In particular, at start up, no flammable gas (e.g., LPG or natural gas) is provided to the pilot light 224. This is to prevent the buildup of gas within the combustion chamber 12 or the surrounding area which would create a dangerous combustible environment. Upon depression of the push button switch 222, an ignition and logic control unit may start a flow of combustible gas to the pilot light 224. Simultaneously, an ignition source may light the flame of the pilot light 224. A thermocouple or sensor 226 may sense the pilot light 224. The ignition and logic control unit upon receiving information that the sensor 226 senses the flame of the pilot light 224 may allow combustible gas to flow into the elongate tubes 64 of the fire sources 62. The combustible gas flowing through the elongate tubes 64 will exit the elongate tubes 64 and may be ignited by the pilot light 224. If the pilot light 224 is insufficient to light all of the fire sources 62, then additional pilot lights 224 may be disposed adjacent to the other fire sources 62 as shown by the dash lines in FIG. 16. Fire source sensors 228 may also be disposed adjacent the fire sources 62 to sense the flame of the fire sources 62. During operation, if the fire sources 62 fail to produce a flame, the sensors 228 may sense such lack of flame. At this point, gas or combustible gas is exiting the elongate tubes 64 and may be accumulating within the combustion chamber 12 and the surrounding area.

This creates a dangerous situation. As such, the ignition and logic control unit may turn off gas flow to the fire sources 62 when the sensors 228 sense a lack of flame at the fire sources 62. Similarly, when the sensor 226 senses that the pilot light 224 is no longer lit, the ignition and logic control unit may cease or stop flow of combustible gas to the pilot light 224 and/or fire sources 62.

It is also contemplated that instead of a push button switch 222, a remote control 230 may function identical to the push button switch 222.

It is also contemplated that a rotatable knob 232 may function similar to the push button switch or remote control 230. Upon turning of the rotatable knob 232, gas may be provided to the pilot light 224 and the ignition source may light the combustible gas flowing through the pilot 224. The ignition and logic control unit may receive information from sensor 226 that the pilot light 224 is lit. Upon receipt of such information, the logic control unit may supply gas to the elongate tubes 64 or the fire sources 62. The pilot light 224 may light the fire sources 62. The logic control unit may maintain gas flow through the elongate tubes 64 as long as sensors 228 sense a flame at the fire sources 62. Based on a position of the rotatable knob 232, more or less combustible gas may be flowed through the elongate tubes 64.

The push button switch 222 and rotatable knob 232 are shown as being located outside of the fire box of the fireplace 160 in the wall 162 of the building (see FIG. 15). The push button switch 222 and rotatable knob 232 shown in FIG. 15 are shown as being integrated into the fireplace 160. During retrofit, a push button switch 222 and rotatable knob 232 along with any other components of the ignition system 220 that may be required may be mounted exterior to the fire box of the fireplace 160 as shown in dash lines in FIG. 15. Alternatively, the push button switch 222 and the rotatable knob 232 may be mounted in the combustion chamber 12 or on the fire grate 174 as shown by dash lines in FIG. 16. In this instance, the push button switch 222 and the rotatable knob 232 may be enclosed within a heat insulated enclosure 236 for protecting any heat sensitive components of the ignition system 220 including but not limited to the switch 222 and/or rotatable knob 232. Additionally, any heat sensitive components of the ignition system 220 may also be disposed within the heat insulated enclosure 236 mounted to the front of the grate 174 or other location within the fire box or combustion chamber 12. The heat insulated enclosure 236 protects the heat sensitive components of the ignition system 220 from damage caused by heat from the burning biomass/fuel 20 and the coal bed 178.

The pilot light 224 and sensor 226 may be located adjacent one or more of the fire sources 62 as shown in FIG. 16. Referring to FIG. 9, the pilot light 224 and the sensor 226 may be protected by a perforated cover 234 to protect the flame of the pilot light 224 from wind draft through the fireplace 160 or other wind causing events.

The pilot light 224, sensor 226, cover 234 may be implemented in any one of the fireplace designs discussed herein including but not limited to the pre-fabricated fireplace 160, masonry fireplace 200, a retro-fit fire grate 10 for existing fireplaces. Likewise, the push button switch 222, rotatable knob 232 and/or the remote control system 230 may be implemented in any one of the fireplaces discussed herein including but not limited to the pre-fabricated fireplace 160, masonry fireplace 200, retro-fit fire grate 10 for existing fireplaces. The rotatable knob 232 or the push button switch 222 or the receiving unit for the remote control 230 may be mounted off of the fireplace (see FIG. 15) and on a wall of the building or in the fireplace (see FIG. 16 in dash lines) for any of the fireplaces discussed herein including but not limited to the pre-fabricated fireplace 160, masonry fireplace 200 or the improved fire grate 10 for retrofitting the fire grate into existing fireplaces.

As discussed above in relation to FIGS. 1 and 2, additional fire sources 62 may be disposed within the secondary combustion zone 48 of the combustion chamber. Likewise, additional fire sources 62 may be disposed within the second combustion zone 48 of the combustion chamber of the pre-fabricated fireplace 160 or the masonry fireplace 200. These additional fire sources 62 may be routed to the secondary combustion zone 48 and mounted to the air conduit also routed to the second combustion zone 48 as discussed above. The gas line that feed these additional fire sources 62 may be routed under the combustion chamber 12, laterally on the sides of the combustion chamber 12 or through the combustion chamber in the same manner as described in relation to providing fresh oxygen to the secondary combustion zone 48.

Additionally, although only two fire sources 62 are shown in the figures, any number of fire sources 62 are contemplated underneath the biomass/fuel 20. The baffle plate 54 discussed in relation to FIGS. 15-17B may have the same structure, orientation, purpose as that described in relation to FIGS. 1-3, 7 and 8. The ignition and logic control unit 84 discussed in relation to FIG. 6 may also be incorporated into the prefabricated fireplace 160 and the masonry fireplace 200. Also, the manifold discussed in relation to FIG. 9-14 may be incorporated into the prefabricated fireplace 160 and the masonry fireplace.

The air conduits 164, 202 and various tubes for flowing fresh oxygen/air to the secondary combustion zone 48 of the combustion chamber 12 may be fabricated from a square or rectangular tubing. The rectangular tubing may be generally flat to allow for more room within the combustion chamber 12.

The baffle plate 54 disposed in the secondary combustion zone 48 increases the time that particulate stays within the combustion chamber to increase efficiency of the fireplace, increases the temperature within the combustion chamber to promote a cleaner burn of particulate and turbulence so that stratified gas streams of air is mixed so as to promote complete combustion of the unburnt particulate. Moreover, through holes 67 may be formed in the baffle plate 54 that extend from the lower surface 60 and/or channels 65 to the upper surface 69 for the purposes of encouraging particulate removal and mixing of oxygen rich air with the oxygen starved air.

Figure 18:
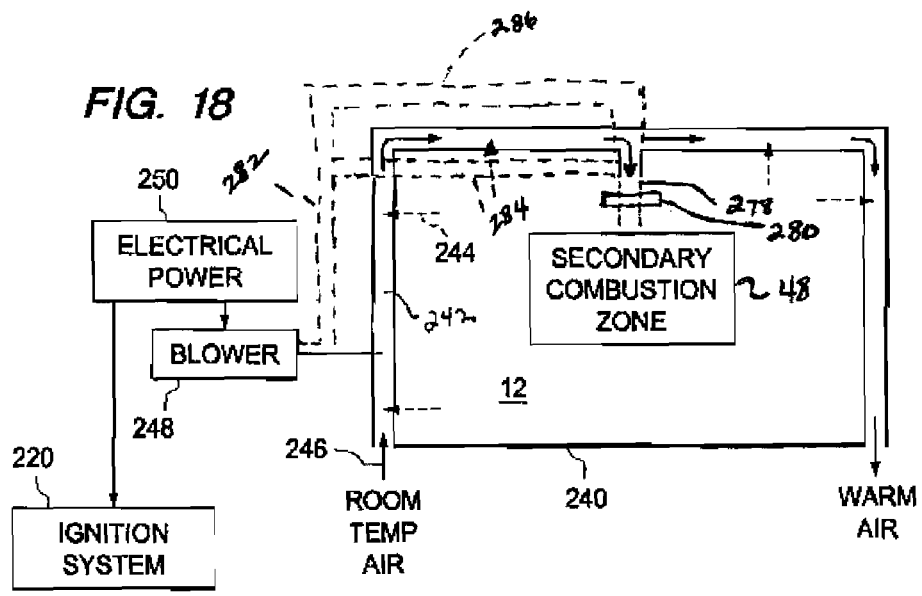
FIG. 18 is a top cross sectional view of a fireplace with a room heater wherein fresh air is bled off of the room heater and provided to the secondary combustion zone of the fireplace to promote reduced emissions.

Referring now to FIG. 18, a fire box 240 defining the combustion chamber 12 is shown. Certain fireplaces utilize the heat generated from the burning biomass/fuel 20 to provide warm air to the room. In particular, an air conduit 242 may circumscribe the fire box 240. The air conduit 242 may be configured so as to facilitate heat transfer from the fire box 240 to the air conduit 242. Heat transfer is shown in dash lines 244 in FIG. 18. Air 246 may be forced through the air conduit 242 by blower 248. Blower 248 may be powered by electrical power 250. In certain instances, the electrical power 250 may provide power to the ignition system 220 and other electrical needs discussed herein. Also, the air flow through the conduit 242 may be bled off to provide fresh air to the secondary combustion zone 48 in lieu of the induced air embodiments discussed herein. Alternatively, air may be routed to the secondary combustion zone 48 by way of air conduit 282 and 286. Accordingly, the fresh air may be provided to the secondary combustion zone 48 as forced air. Alternatively, as discussed above, the fresh air may be provided to the secondary combustion zone 48 by way of induced air (i.e., no power)

as discussed herein. It is further contemplated that the fresh air may be provided to the secondary combustion zone 48 as a combination of forced air as well as induced air by merging the air flows of the forced air and induced air.

The air conduit 278 routed to the secondary combustion zone 48 may be accomplished by connecting the air conduit 278 to the air flow within the fire grate 10. The air conduit 278 may have a one way valve 280 so that smoke does not backflow into the conduit 242 thereby dangerously flowing smoke back into the room. As an alternate method or an additional method of preventing smoke backflow, the blower 248 may have a second air conduit 282 which may be routed into the fire box 240 as shown by reference numeral 284 so as to preheat the air flowing in the conduit 284. The heated air continually pumps air by induction to the secondary combustion zone 48 to mitigate backflow of smoke into the conduit 242.

Figure 19:
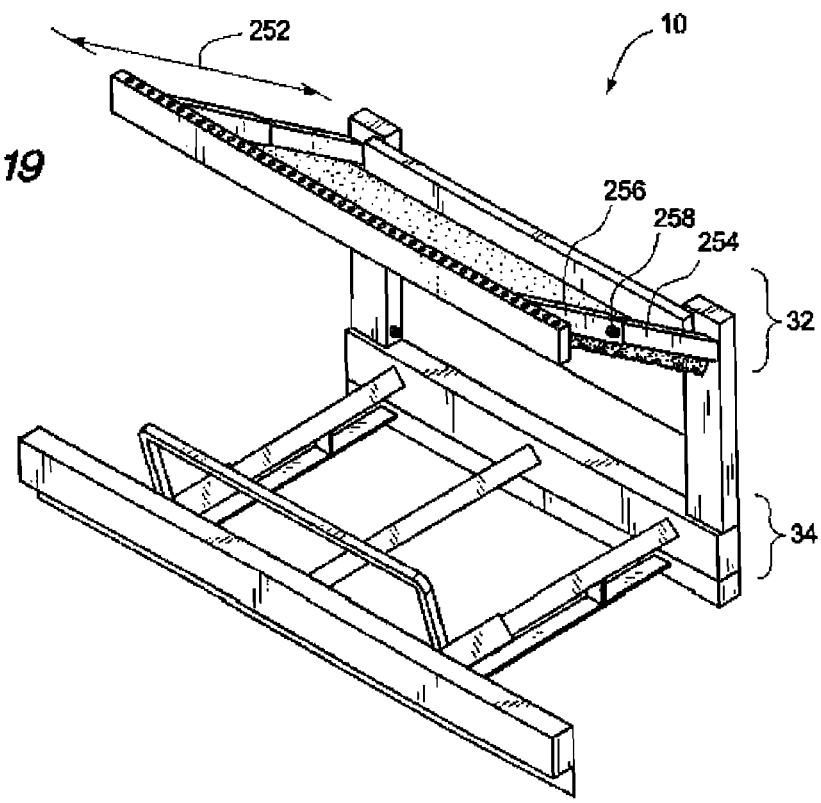
FIG. 19 is a perspective view of an alternate embodiment of the fire grate wherein a depth of the upper frame 32 is adjustable.
Figure 20:
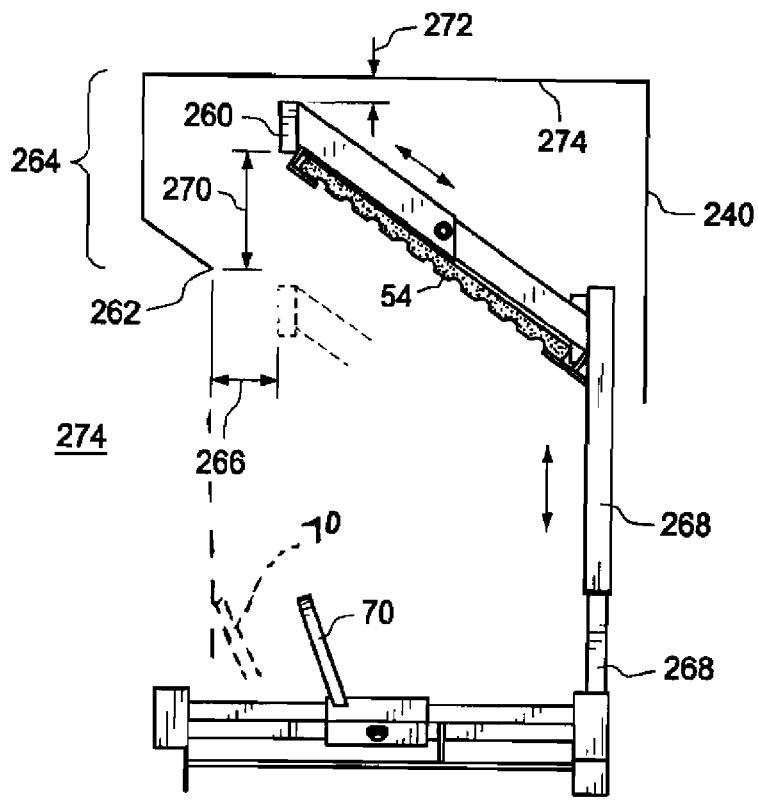
FIG. 20 is a side view of the fire grate shown in FIG. 19 with retaining members that are adjustable with respect to a depth of the fireplace.
Figure 21:
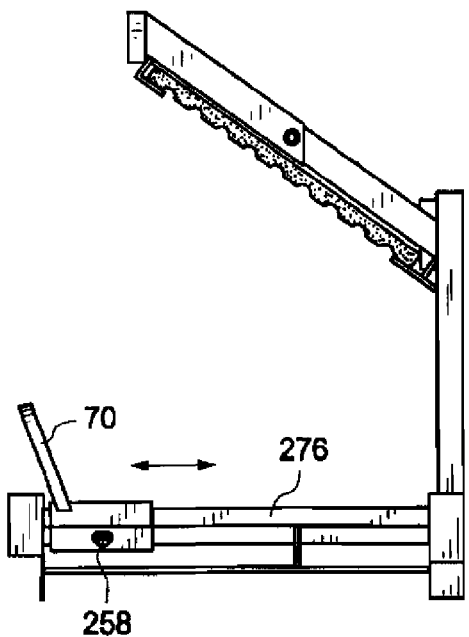
FIG. 21 is a side view of the fire grate shown in FIG. 19 with the retaining members in a different position compared to the position shown in FIG. 20.

Referring now to FIGS. 19-21, an alternate embodiment of the fire grate 10 is shown. A depth adjustment for the upper and lower frames 32, 34 is shown. Nonetheless, other features of the improved fire grate 10 discussed herein such as width adjustment and vertical adjustment are also contemplated. Additionally, the other features of the improved fire grate 10 may also be incorporated such as providing additional fire sources at the upper frame 32, etc. As such, although the following discussion of the improved fire grate 10 focuses on the depth adjustment of the improved fire grate 10, the improved fire grate 10 shown in FIGS. 19-21 may also incorporate the other features of the improved fire grate 10 discussed herein. For example, the telescoping members 254, 256 may be air conduits for providing air to the secondary combustion zone 18.

A depth 252 of the improved fire grate 10 may be adjusted in the following manner. In particular, the upper frame 32 may comprise first and second telescoping members 254, 256. By way of example and not limitation, the first telescoping member 254 may slide in and out of the second telescoping member 256. The position of the first and second telescoping members 254, 256 as well as the depth 252 of the upper frame 32 may be fixed by set screw or locking bolt 258. Referring now to FIG. 20, when the improved fire grate 10 is disposed within the fire box 240 of the fireplace 160, the position of a front cross bar 260 with respect to a lip 262 of a smoke shelf 264 may be adjusted by way of the first and second telescoping members 254, 256 of the upper frame 32. This adjusts a distance 266 of the front cross bar 260 to the lip 262 of the smoke shelf 264 to leave a sufficient gap so that smoke can rise up therebetween. A vertical position of the front cross bar 260 with respect to the lip 262 of the smoke shelf 264 may also be adjusted by vertical telescoping members 266 and 268. The vertical distance 270 of the front cross bar 260 with respect to the lip 262 may be adjusted by adjusting the vertical telescoping members 266, 268. The front cross bar 260 may be positioned at or below the lip 262. However, it is also contemplated that the front cross bar 260 may be positioned above the lip 262. In the latter instance, the front cross bar 260 may have a gap 272 from a top surface 274 of the fire box 240. The upper frame 32 as well as the front cross bar 260 may be sized and positioned within the fire box 240 so that smoke rising up from a biomass/fuel 20 does not spill through a front 274 of the fireplace 160 (i.e., sufficiently large distance 266) yet facilitates combustion efficiency and reduced emissions due to the various improved features discussed herein and the heat being redirected by the upper frame 32 as well as the baffle plate 54 does not significantly alter the heat distribution within the fire box 240 or maintains the redistributed heat within acceptable limits.

Referring now to FIG. 21, the retaining members 70 may be adjusted front to back as shown by comparison of FIGS. 20 and 21. The retaining members 70 may slide upon rails 276 and be set in a position by way of set screw 258. Preferably, the retaining member 70 should be behind the lip 262 of the smoke shelf 264. In other words, the retaining members 70 preferably may be positioned up to the front lip 262 of the smoke shelf 264 as shown in dash lines in FIG. 20 and not in front of the front lip 262 of the smoke shelf. The reason is to maintain the original design of the fireplace. Limiting movement of the retaining member 70 limits the amount of biomass/fuel 20 (e.g., logs) that can burn within the fireplace at one time. The rails 276 may also be telescoping by way of inner and outer telescoping rails which may be fixed by set screws. This adjusts a depth of the lower frame 34.

In the discussion above in relation to FIGS. 19-21, a fireplace 160 with a smoke shelf 264 was discussed. Certain fireplaces do not incorporate smoke shelves 264. Nonetheless, the upper frame 32 as well as the front cross bar 260 may be adjusted so as to improve the emissions of the fireplace and yet maintain fire distribution within the fire box 240 within acceptable limits.

The above description is given by way of example, and not limitation. Given the above disclosure, one skilled in the art could devise variations that are within the scope and spirit of the invention disclosed herein, including various ways of fixing the width 22 of the improved fire grate after adjustment. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A fireplace for promoting a cleaner burn of fuel within a combustion chamber of the fireplace, the fireplace comprising:
    a fireplace grate comprised of tubular telescoping conduits, the fireplace further comprising;
    a combustion chamber having a primary combustion zone and a secondary combustion zone, said primary combustion zone comprising a support structure for supporting combustible biomass and a flame area, and said secondary combustion zone being situated above the primary combustion zone and in the path taken by rising emissions and oxygen starved air when combustion is occurring in the primary combustion zone;
    the fireplace grate comprising
    a hollow tubular conduit defining a first end portion in fluid communication with an air source and a second end portion with a plurality of air apertures, the second end portion disposable in the secondary combustion zone of the combustion chamber of the fireplace; and
    a means for flowing air through the hollow tubular conduit from the first end portion to the second end portion through the air apertures for introducing oxygen to the rising emissions and oxygen starved air in the secondary combustion zone of the combustion chamber when combustion is occurring in the primary combustion zone to encourage complete combustion and reduction of harmful emissions.

2. The fireplace of claim 1 wherein the means for flowing air through the hollow conduit is a blower.

3. The fireplace of claim 1 wherein the air apertures of the second end portion of the hollow tubular conduit are directed downwardly toward a primary combustion zone of the combustion chamber.

4. The fireplace of claim 1 wherein the air apertures of the second end portion of the hollow tubular conduit are directed outwardly from an upper frame disposed in the secondary combustion zone and formed by the hollow tubular conduit.

5. The fireplace of claim 1 wherein the first end portion of the hollow tubular conduit is routed from a fresh air source through the primary combustion zone of the combustion chamber and to the secondary combustion zone of the combustion chamber for preheating the fresh air.

6. The fireplace of claim 1 further comprising a baffle plate disposed in an upper region of the secondary combustion zone of the combustion chamber, the baffle plate having a plurality of channels formed on a lower surface of the baffle plate for disturbing rising combustion gas and incompletely burned particulates.

7. The fireplace of claim 1 further comprising a baffle plate disposed in the secondary combustion zone of the combustion chamber and routes rising combustion gas to the fresh air introduced into the secondary combustion zone of the combustion chamber via the second end portion of the hollow tubular conduit.

8. The fireplace of claim 6 wherein the channels are routed toward an outer periphery of the baffle plate.

9. The fireplace of claim 6 wherein the baffle plate has a plurality of holes extending from a lower surface of the baffle plate to an upper surface of the baffle plate.

10. The fireplace of claim 1 further comprising a log lighter in the secondary combustion zone of the combustion chamber for promoting burning of incompletely burned particulates.

11. The fireplace of claim 10 wherein the log lighter comprises:
 an elongate tube connected to a flammable gas source, the elongate tube having a plurality of holes for directing flames in a direction of the plurality of holes, the direction of the plurality of holes being directed toward walls of the combustion chamber.

12. The fireplace of claim 7 further comprising a log lighter in the secondary combustion zone of the combustion chamber wherein the log lighter is positioned in the secondary combustion zone of the combustion chamber with the flames of the log lighter directed into the combustion gas rerouted by the baffle plate.

13. The fireplace of claim 10 further comprising:
 one or more log lighters in a primary combustion zone of the combustion chamber;
 a logic control unit that supplies gas and ignites one or more of the log lighters in the primary and secondary combustion zones and shuts off gas flow as a function of temperature within the combustion chamber.

14. The fireplace of claim 1 further comprising two or more log lighters in a primary combustion zone below the secondary combustion zone, each log lighter attached to a mixing device, the mixing device comprising:
 two or more mixing chambers, each mixing chamber in fluid communication with the log lighter;
 a manifold for receiving flammable gas and flowing flammable gas into the mixing chambers through an orifice;
 an air conduit in fluid communication with the mixing chamber to introduce fresh air into the mixing chamber, the air conduit directed away from the fuel being burned so that an ignition source does not inadvertently enter the mixing chamber and prematurely ignite the mixed air/fuel.

15. The fireplace of claim 14 wherein each mixing chamber has one air inlet and a common air chamber is in fluid communication with the air inlets so that a single air conduit can feed air into the air inlets.

16. The fireplace of claim 1 wherein the fireplace is a masonry fireplace or a prefabricated fireplace.

17. The fireplace of claim 1 wherein the hollow tubular conduit is routed underneath the combustion chamber.

18. The fireplace of claim 17 wherein the hollow tubular conduit is routed behind the combustion chamber and penetrates a back wall of the combustion chamber to position the second end portion of the hollow tubular conduit at the secondary combustion zone of the combustion chamber.

19. The fireplace of claim 17 wherein the hollow tubular conduit penetrates a floor of the combustion chamber and is routed upward within the combustion at a backside of the combustion chamber to position the second end portion of the hollow tubular conduit at the secondary combustion zone of the combustion chamber.

20. The fireplace of claim 1 wherein the hollow tubular conduit is routed on a lateral side of the combustion chamber.

21. The fireplace of claim 20 wherein the hollow tubular conduit penetrates a sidewall of the combustion chamber to position the second end portion of the hollow tubular conduit at the secondary combustion zone of the combustion chamber.

22. The fireplace of claim 1 wherein the hollow tubular conduit is integrated within a fire grate disposed within the combustion chamber.

23. The fireplace of claim 1 wherein a floor of the combustion chamber incorporates an elongate recess and the fireplace has a fire source disposed within the elongate recess for hiding the fire source from a frontal area of the fireplace.

24. The fireplace of claim 1 wherein the hollow tubular conduit is integrated within a fire grate disposed within the combustion chamber.

25. The fireplace of claim 1 wherein a floor of the combustion chamber incorporates an elongate recess and the fireplace has a fire source disposed within the elongate recess for hiding the fire source from a frontal area of the fireplace.

* * * * *